United States Patent
Stepin et al.

(10) Patent No.: US 10,425,661 B2
(45) Date of Patent: Sep. 24, 2019

(54) METHOD FOR PROTECTING A VIDEO FRAME SEQUENCE AGAINST PACKET LOSS

(71) Applicant: Huawei Technologies Co., Ltd., Shenzhen, Guangdong (CN)

(72) Inventors: Victor Alexeevich Stepin, Moscow (RU); Valery Valerievich Anisimovskiy, Moscow (RU)

(73) Assignee: HUAWEI TEHCNOLOGIES CO., LTD., Shenzhen (CN)

( * ) Notice: Subject to any disclaimer, the term of this patent is extended or adjusted under 35 U.S.C. 154(b) by 795 days.

(21) Appl. No.: 14/866,256

(22) Filed: Sep. 25, 2015

(65) Prior Publication Data
US 2016/0021397 A1    Jan. 21, 2016

Related U.S. Application Data

(63) Continuation of application No. PCT/RU2013/000257, filed on Mar. 28, 2018.

(51) Int. Cl.
H04N 19/65    (2014.01)
H04N 19/48    (2014.01)
(Continued)

(52) U.S. Cl.
CPC ............ *H04N 19/65* (2014.11); *H04N 19/48* (2014.11); *H04N 19/50* (2014.11);
(Continued)

(58) Field of Classification Search
None
See application file for complete search history.

(56) References Cited

U.S. PATENT DOCUMENTS 5,831,688 A    11/1998  Yamada et al.
6,104,757 A *  8/2000  Rhee ................. H04B 1/66
                                                  375/240.12
(Continued)

FOREIGN PATENT DOCUMENTS

CN    1126409 A    7/1996
CN    1325594 A    12/2001
(Continued)

OTHER PUBLICATIONS

A. Tamhankar et al., "An Overview of H.264/MPEG-4 Part 10", 4th EURASIP Conference focused on Video/Image Processing and Multimedia Communications, Jul. 2-5, 2003, 51 pages.
(Continued)

*Primary Examiner* — James M Anderson, II
(74) *Attorney, Agent, or Firm* — Staas & Halsey LLP

(57) ABSTRACT

The invention relates to a method for protecting a video frame sequence against random and/or burst packet losses, the method comprising: partitioning the video frame sequence into a plurality of interleaved video frame subsequences; independently encoding the plurality of interleaved video frame subsequences by a differential video codec; generating for at least one of the plurality of interleaved video frame subsequences at least one B frame predicted from another one of the plurality of interleaved video frame subsequences; and using the at least one B frame as redundant B frame for protecting the video frame sequence.

15 Claims, 15 Drawing Sheets

(51) Int. Cl.
  H04N 19/895   (2014.01)
  H04N 19/577   (2014.01)
  H04N 19/66    (2014.01)
  H04N 19/50    (2014.01)
(52) U.S. Cl.
  CPC ........... *H04N 19/577* (2014.11); *H04N 19/66* (2014.11); *H04N 19/895* (2014.11)

(56) References Cited

U.S. PATENT DOCUMENTS

| | | | |
|---|---|---|---|
| 6,744,924 B1 | 6/2004 | Hannuksela et al. | |
| 2002/0118295 A1 | 8/2002 | Karczewicz et al. | |
| 2004/0218669 A1* | 11/2004 | Hannuksela | H04N 19/107 375/240.01 |
| 2006/0093031 A1 | 5/2006 | Van Der Schaar et al. | |
| 2006/0285589 A1 | 12/2006 | Hannuksela | |
| 2009/0238267 A1* | 9/2009 | Li | H04N 21/23424 375/240.03 |
| 2010/0177776 A1 | 7/2010 | Crinon et al. | |
| 2011/0090961 A1* | 4/2011 | Fong | H04N 7/50 375/240.15 |
| 2014/0241426 A1* | 8/2014 | Fucci | H04N 7/147 375/240.12 |
| 2015/0172661 A1* | 6/2015 | Dong | H04N 19/51 375/240.03 |

FOREIGN PATENT DOCUMENTS

| | | | |
|---|---|---|---|
| CN | 1672421 A | 9/2005 | |
| CN | 1781314 A | 5/2006 | |
| GB | 2 343 321 A | 5/2000 | |
| GB | 2343321 A * | 5/2000 | ............. H04N 19/89 |
| WO | WO 02/15589 A1 | 2/2002 | |

OTHER PUBLICATIONS

Gary J. Sullivan, et al., "Overview of the High Efficiency Video Coding (HEVC) Standard", IEEE Transactions on Circuits and Systems for Video Technology, vol. 22, No. 12, Dec. 2012, p. 1649-1668.

Heiko Schwarz, et al., "Overview of the Scalable Video Coding Extension of the H.264/AVC Standard", IEEE Transactions on Circuits and Systems for Video Technology, vol. 17, No. 9, Sep. 2007, p. 1103-1120.

Gary J. Sullivan, et al., "The H.264/AVC Advanced Video Coding Standard: Overview and Introduction to the Fidelity Range Extensions", Presented at the SPIE Conference on Applications of Digital Image Processing XXVII Special Session on Advances in the New Emerging Standard: H264/AVC, Aug. 2004, 22 pages.

Dr. Stephan Wenger, "Video Redundancy Coding in H.263+", ImageTech '97, Sep. 1, 1997, 21 pages.

Apostolopoulos, John G., "Error-Resilient Video Compression Through the Use of Multiple States," IEEE, 2000, 4 pages.

Reibman, Amy R., et al., "Multiple Description Coding for Video Using Motion Compensated Prediction," IEEE, 1999, 5 pages.

Wang, Yao, et al., "Error-Resilient Video Coding Using Multiple Description Motion Compensation," IEEE 2001, 6 pages.

Yu, Zhaoming, "Mobile digital TV technology," Huawei, The People's Posts and Telecommunications Press, Jul. 31, 2007, 22 pages with partial translation.

Jin Young Lee, et al., "Evaluation of Interleaved Source Coding over Memoryless Binary Erasure Channel", ICACT 2009, p. 2346-2350.

John G. Apostolopoulos, "Error-Resilient Video Compression Via Multiple State Streams", International Workshop on Very Low Bitrate Video Coding (VLBV'99), Oct. 1999, 4 pages.

Jin Young Lee, et al., "Interleaved Source Coding (ISC) for Predictive Video Coded Frames over the Internet", IEEE 2005, p. 1224-1228.

Stephan Wenger, "Error Resilience Support in H.263+", 1998, 25 pages.

J. Ott, et al., "Extended RTP Profile for Real-time Transport Control Protocol (RTCP)-Based Feedback (RTP/AVPF)", Network Working Group, Jul. 2006, 51 pages.

* cited by examiner

METHOD FOR PROTECTING A VIDEO FRAME SEQUENCE AGAINST PACKET LOSS

CROSS-REFERENCE TO RELATED APPLICATIONS

This application is a continuation of International Application No. PCT/RU2013/000257, filed on Mar. 28, 2013, which is hereby incorporated by reference in its entirety.

BACKGROUND

The present invention relates to a method for protecting a video frame sequence against random and/or burst packet loss, in particular to a method of video stream protection in IP network with packet loss.

In modern world exponential IP traffic growth can be observed, because Voice & Video over IP (VVOIP) systems usage expansion. In such condition insufficient network capacity causes network impairments, e.g. packet loss, delays and network jitter which dramatically decrease video and audio quality in real-time VVoIP systems especially for video transmission over an IP network. Most popular modern video codecs such as H.264 AVC, H.264 SVC and HEVC use differential coding algorithms and thus, if even a single video frame is lost during transmission, then all subsequent video frames cannot be decoded until periodic INTRA frame reception. Even low network packet loss causes strong video quality degradation because of this reason. So, video traffic protection algorithms development for IP networks with packet loss is a very important problem. Robust video traffic protection algorithms allow significantly improving the video quality in IP networks with packet loss.

A modern video stream packet loss protection algorithm should satisfy the following requirements: Minimizing time interval between correctly decoded video frames after frame loss, allowing fast decoder state recovery after a packet loss, minimizing coding efficiency degradation, minimizing frame rate degradation, avoiding to introduce additional delay at the sender and receiver sides and minimizing recovery error propagation if a lost frame cannot be exactly restored. The algorithm should protect the video stream from random and burst packet losses because modern routers can use different algorithms for congestion control.

Lost packet retransmission (NACK) as described in RFC 4585: "Extended RTP Profile for Real-time Transport Control Protocol (RTCP)-Based Feedback (RTP/AVPF)" is the most popular method used for packet loss protection. According to this method, the receiver detects a packet loss and sends a corresponding negative acknowledgment to the transmitter side. The transmitter resends a lost packet to the receiver based on this information. This algorithm is efficient only for network channels with low round-trip time and low packet loss probability. Otherwise, it introduces a significant algorithmic delay and thus dramatically decreases the video quality. This method is external with respect to the video codec and the amount of requested information doesn't depend on the video content. It reduces coding efficiency with respect to methods which integrate source and channel coding. Forward error correction is often used for lost packet recovery in network with big network delay and jitter, but the usage of this method for video stream protection is limited by a low FEC efficiency for the case where each video frame is encoded separately because of short frame length in RTP packets or by a significant algorithmic delay for the case where several video frames are encoded by one code word and by a long algorithmic delay if RTP packet interleaving is used.

External methods of video stream packet loss protection which use interleaved source coding add redundancy at the source coding level for frame loss protection. FIG. 14 shows a flow chart for interleaved source coding. According to FIG. 14, interleaved source coding introduces two or more interleaved video streams 1601, 1602 which are encoded independently. If one video stream 1601 cannot be decoded because of packet loss, other video streams 1602 can be decoded and displayed 1603. All video streams can be restored after a GOP period, when a periodic INTRA frame arrives. Interleaved source coding is an effective method for video stream packet loss protection. It can be used for random and burst packet loss protection, but it has the following drawback. If even a single packet in one independent stream is lost then this steam cannot be recovered until periodic INTRA frame receiving. In this case, the displayed frame rate is decreased and the time distance between two correctly decoded frames is increased on the receiver side. After packet loss, the correct receiver state can be restored only after a periodic INTRA frame receiving, so INTRA frames should be inserted sufficiently often and consequently, for a constant bit rate video quality will be deteriorated.

Video redundancy coding as described by S. Wenger, G. Knorr, J. Ott, and F. Kossentini in "Error resilience support in H.263+," IEEE Transactions on Circuits and Systems for Video Technology, vol. 8, pp. 867-877, November 1998, extends the ISC algorithm. As in the ISC algorithm, the source video stream is separated into two interleaved video streams 1701, 1702 according to FIG. 15 which streams are independently coded. For a fast decoder state recovery, special synchronization frames 1703, 1705 are introduced. These frames are predicted from both video streams 1701, 1702 and can be decoded if at least one independent video stream is uncorrupted. After the synchronization frame independent video streams are predicted from this frame. The VRC algorithm allows decreasing the decoder state recovery time relative to the general ISC algorithm. The VRC algorithm however has a lot of drawbacks. If an INTRA frame is used as synchronization frame, then this algorithm has the same drawbacks as the general ISC algorithm. If an SP frame is used as synchronization frame, then it should require less bits than an INTRA frame, but if several video frame streams are used, the synchronization frame will require much more bits and thereby synchronization frame encoding efficiency will be decreased. Further, the VRC algorithm is sensitive to synchronization frame loss. If this frame is lost, then all subsequent video frame streams cannot be decoded. Only forward prediction is used for synchronization frame encoding. It reduces coding efficiency relative to a bidirectional frame prediction. After a packet loss the video decoder state can only be recovered after synchronization frame receiving. It thus decreases the decoder state recovery time relative to other packet loss protection algorithms.

SUMMARY

It is the object of the invention to provide an improved technique for protecting a video frame sequence against packet losses.

This object is achieved by the features of the independent claims. Further implementation forms are apparent from the dependent claims, the description and the figures.

The invention is based on the finding that such an improved technique is provided by dividing the input video frame sequence into two or more interleaved video frame sub-sequences which are encoded independently. Each video frame chain uses special recovery P frames with long links to reference picture for decoder state recovery after a frame loss. Recovery frames from each independent video stream are protected by redundant B frames which use reference frames from some other independent video stream. Such a protection allows restoring all lost video frame streams if at least one video frame stream is uncorrupted. An algorithm implementing that technique can be applied for video stream packet loss protection in VVoIP systems.

In order to describe the invention in detail, the following terms, abbreviations and notations will be used:

IP: Internet Protocol.
VVOIP: Voice and Video over IP.
H.264: Video Codec according to ITU-T H.264 standard.
H.264 AVC: Video Codec according to ITU-T H.264 Advanced Video Coding standard.
H.264 SVC: Video Codec according to ITU-T H.264 Scalable Video Coding standard.
HEVC: High Efficient Video Coding according to ITU-T H.265 standard or according to MPEG-H part 2 standard.
SVC200: a video frame stream configuration that uses Golden/Recovery frames technology for packet loss protection.
SVC47,
SVC37,
SVC27: video frame stream configurations that use packet loss protection according to aspects of this invention as described below.
FEC: Forward Error Correction.
RTP: Real-time Transfer Protocol. The Real-time Transport Protocol (RTP) defines a standardized packet format for delivering audio and video over IP networks. RTP is used extensively in communication and entertainment systems that involve streaming media, such as telephony, video applications, teleconference applications and television services. RTP is used in conjunction with the RTP Control Protocol (RTCP). While RTP carries the media streams (e.g., audio and video), RTCP is used to monitor transmission statistics and quality of service (QoS) and aids synchronization of multiple streams.
GOP: Group Of Pictures. In video coding, a group of pictures, or GOP structure, specifies the order in which intra- and inter-frames are arranged. The GOP is a group of successive pictures within a coded video stream. Each coded video stream consists of successive GOPs. From the pictures contained in it, the visible frames are generated. A GOP can contain the following picture types: I-picture or I-frame (intra coded picture)—reference picture, which represents a fixed image and which is independent of other picture types. Each GOP begins with this type of picture. P-picture or P-frame (predictive coded picture)—contains motion-compensated difference information from the preceding I- or P-frame. B-picture or B-frame (bidirectionally predictive coded picture)—contains difference information from the preceding and following I- or P-frame within a GOP. D-picture or D-frame (DC direct coded picture)—serves the fast advance.
ISC: Interleaved Source Coding. Interleaved Source Coding is one of the error resilient coding methods for predictive video coded frames transmitted over a single erasure channel. ISC has shown to significantly improve the overall quality of predictive coded video stream over a lossy channel.
VRC: Video Redundancy Coding. Video Redundancy Coding is one of error-resilient encoding mechanisms to suppress the temporal error propagation. The algorithm is to send at least two threads of P-frames simultaneously where each of these P-frames depend on the earlier P-frame of the thread but not on any information of the other thread(s). Newly coded pictures will be assigned to the various threads in an interleaved manner. All threads are started from sync frame and ended in two another sync frame. If one thread is damaged, the other threads remain intact and can be decoded and displayed.
Video frame: In the field of video compression a video frame is compressed using different algorithms with different advantages and disadvantages, centered mainly around amount of data compression. These different algorithms for video frames are called picture types or frame types. The three major picture types used in the different video algorithms are I, P and B. I-frames are the least compressible but don't require other video frames to decode. P-frames can use data from previous frames to decompress and are more compressible than I-frames. B-frames can use both previous and forward frames for data reference to get the highest amount of data compression.
P frame: A P-frame ('Predicted picture') holds only the changes in the image from the previous frame. The encoder does not need to store the unchanging background pixels in the P-frame, thus saving space. P-frames are also known as delta-frames.
B frame: A B-frame ('Bi-predictive picture') saves even more space by using differences between the current frame and both the preceding and following frames to specify its content.
I frame: An I-frame is an 'Intra-coded picture', in effect a fully specified picture, like a conventional static image file. P-frames and B-frames hold only part of the image information, so they need less space to store than an I-frame, and thus improve video compression rates.
SP frame: switching P frame. In the video codec H.264, the frame can be segmented into sequences of macroblocks called slices, and instead of using I, B and P-frame type selections, the encoder can choose the prediction style distinctly on each individual slice. In H.264 several additional types of frames/slices are found. SP-frames/slices (Switching P) and SI-frames or slices facilitate switching between coded streams. Multi-frame motion estimation allows increases in the quality of the video while allowing the same compression ratio. SI- and SP-frames which are defined for Extended Profile will allow for increases in the error resistance. When such frames are used along with a smart decoder, it is possible to recover the broadcast streams of damaged DVDs.
SB frame: switching B frame, redundant B frame, protected B frame. SB-frames allow for increases in the error resistance. When such frames are used along with a smart decoder, it is possible to recover the broadcast streams of damaged DVDs.
INTRA frame: Intra-frame coding is used in video coding (compression). The term intra-frame coding refers to the fact that the various lossless and lossy compression techniques are performed relative to information that is contained only within the current frame, and not relative to any other frame in the video sequence. In other words, no temporal processing is performed outside of the current picture or frame. The coding process varies greatly depending on which encoder is used (e.g.: JPEG, H.264), but the most common steps usually include: partitioning into macro-blocks, transform (e.g.: DCT, or wavelet), quantization and entropy encoding. Intra-frame coding is applied to the partitioning into macro-blocks step.

Entropy encoding: In information theory an entropy encoding is a lossless data compression scheme that is independent of the specific characteristics of the medium. One of the main types of entropy coding creates and assigns a unique prefix-free code to each unique symbol that occurs in the input. These entropy encoders then compress data by replacing each fixed-length input symbol with the corresponding variable-length prefix-free output code word. The length of each code word is approximately proportional to the negative logarithm of the probability. Therefore, the most common symbols use the shortest codes.

Macro block: A macro block is an image compression component and technique based on discrete cosine transform that is used on still images and video frames. Macro blocks are usually composed of two or more blocks of pixels. The size of a block depends on the codec and is usually a multiple of 4. In modern codecs such as H.263 and H.264 the overarching macro block size is fixed at 16×16 pixels, but this is broken down into smaller blocks or partitions which are either 4, 8 or 16 pixels by 4, 8 or 16 pixels. Combinations of these smaller partitions must combine to form 16×16 macro blocks.

DCT: Discrete Cosine Transform. A discrete cosine transform expresses a sequence of finitely many data points in terms of a sum of cosine functions oscillating at different frequencies. DCTs are important to applications in lossy compression of audio (e.g. MP3) and images (e.g. JPEG) where small high-frequency components can be discarded. The use of cosine rather than sine functions is critical in these applications. For compression, it turns out that cosine functions are much more efficient, i.e., fewer functions are needed to approximate a typical signal.

fps: frames per second.

Y-PSNR: peak signal-to-noise ratio of the Y (luma) component of the macro-blocks.

YCbCr: A color space defined in the ITU-R BT.601-5 and ITU-R BT.709-5 standards of ITU. These documents define YCbCr as a color space for digital television systems. Individual color components of YCbCr color space are luma Y, chroma Cb and chroma Cr.

Quantization: Quantization is the process of mapping a large set of input values to a smaller set such as rounding values to some unit of precision. A device that performs quantization is called a quantizer. The error introduced by quantization is referred to as quantization error or round-off error. Quantization is involved to some degree in nearly all digital signal processing, as the process of representing a signal in digital form ordinarily involves rounding. Quantization, involved in image processing, is a lossy compression technique achieved by compressing a range of values to a single quantum value. When the number of discrete symbols in a given stream is reduced, the stream becomes more compressible. A typical video codec works by breaking the picture into discrete blocks, e.g. of 8×8 pixels in the case of MPEG. These blocks can then be subjected to discrete cosine transform (DCT) to calculate the frequency components, both horizontally and vertically. The resulting block (the same size as the original block) is then pre-multiplied by the quantization scale code and divided element-wise by the quantization matrix, and each resultant element is rounded. The quantization matrix is designed to provide a higher resolution to perceivable frequency components over less perceivable components (usually lower frequencies over high frequencies) in addition to transforming as many components to 0, which can be encoded with greatest efficiency.

According to a first aspect, the invention relates to a method for protecting a video frame sequence against random and/or burst packet losses, the method comprising: partitioning the video frame sequence into a plurality of interleaved video frame subsequences; independently encoding the plurality of interleaved video frame subsequences by a differential video codec; generating for at least one of the plurality of interleaved video frame subsequences at least one B frame predicted from another one of the plurality of interleaved video frame subsequences; and using the at least one B frame as redundant B frame for protecting the video frame sequence.

Such a protection allows restoring all lost video frame streams if at least one video frame stream is uncorrupted. An algorithm implementing that technique can be applied for video stream packet loss protection, for example in VVoIP systems.

According to a second aspect, the invention relates to a video frame encoding method, comprising: encoding a redundant B frame generated with the method according to the first aspect based on a residual signal between a reconstructed video frame of one of the interleaved video frame subsequences and a prediction siynal of a video frame of another one of the interleaved video subsequences.

After a packet loss the video decoder state can be recovered without the need of waiting for a synchronization frame receiving. It thus increases the decoder state recovery time relative to other packet loss protection algorithms.

In a first possible implementation form of the video frame encoding method according to the second aspect, the method comprises: quantizing the residual signal by using a quantization level grid, wherein the quantization level grid corresponds to a quantization level grid used for quantizing a residual signal for encoding a P frame of the video frame sequence.

When the same quantization level grid is used, computational efficiency is improved.

In a second possible implementation form of the video frame encoding method according to the first implementation form of the second aspect, the method comprises: quantizing predicted macro-blocks of the P frame and the redundant B frame by using a same first quantization parameter.

When the same first quantization parameter is used for quantizing the predicted macro-blocks and the redundant B frame, computational efficiency is improved.

In a third possible implementation form of the video frame encoding method according to the second implementation form of the second aspect, the first quantization parameter corresponds to a second quantization parameter used for quantizing a macro-block of the video frame sequence protected by the method according to the first aspect.

When the first quantization parameter corresponds to a second quantization parameter, computational complexity is reduced and the video frame encoding method is performed faster.

According to a third aspect, the invention relates to a video frame decoding method, comprising: decoding a video frame sequence protected by the method according to the first aspect by a differential video codec, wherein a lost video frame of the video frame sequence is replaced by a redundant B frame.

After a packet loss the video decoder state can be recovered by replacing a lost video frame by a redundant B frame without the need of waiting for a synchronization frame receiving. It thus increases the decoder state recovery time relative to other packet loss protection algorithms.

In a first possible implementation form of the video frame decoding method according to the third aspect, the method comprises: recovering the video frame sequence based on the redundant B frame; and displaying the recovered video frame sequence with a delay of one video frame after the decoding.

After a packet loss the video decoder state can be perfectly recovered by waiting for only a delay of one video frame after the decoding.

In a second possible implementation form of the video frame decoding method according to the third aspect, the method comprises: restoring a state of the decoding; and displaying non-redundant video frames without algorithmic delay after the decoding.

After a packet loss the video decoder can display the decoded video sequence without introducing additional delay. Lost frames are just discarded.

In a third possible implementation form of the video frame decoding method according to the third aspect as such or according to the first or the second implementation form of the third aspect, the video frame sequence is decoded by using reference macro-blocks quantized with the first quantization parameter according to the second or the third implementation form of the second aspect.

When the video frame sequence is decoded by using a reference macro-blocks quantized with the first quantization parameter, the same parameter can be applied thereby improving the decoding efficiency.

According to a fourth aspect, the invention relates to a video frame encoding method, comprising: quantizing a macro-block of a P frame of the video sequence protected by the method according to the first aspect by a third quantization parameter; and quantizing a macro-block of a redundant B frame of the video sequence protected by the method according to the first aspect by a fourth quantization parameter calculated on a basis of the third quantization parameter.

The video frame encoding method allows approximately restoring lost frames. Such a simplified encoding algorithm can be used for bit budget saving and providing flexible trade-off between coding efficiency in networks with and without packet loss.

In a first possible implementation form of the video frame encoding method according to the fourth aspect, the fourth quantization parameter is a shifted version of the third quantization parameter.

A shifting operation is easy to implement by using a shift register. The computational complexity is thus reduced.

According to a fifth aspect, the invention relates to a video encoder for encoding a video frame sequence protected by the method according to the first aspect, the video encoder comprising: a motion compensator configured to determine a motion vector from a reference macro-block of the video frame sequence; a discrete cosine transformer configured to determine discrete cosine transform coefficients of the reference macro-block and configured to determine discrete cosine transform coefficients of a current macro-block which is a macro-block of one of a P frame and a B frame of the video frame sequence; and a residual signal processor configured to provide a residual signal based on the discrete cosine transform coefficients of the current macro-block and the discrete cosine transform coefficients of the reference macro-block, the residual signal encoding the video frame sequence.

Such a video encoder provides higher frame rates, smaller freezing times and higher Y-PSNR on receiver side versus packet loss probability than conventional video encoders.

In a first possible implementation form of the video encoder according to the fifth aspect, the video encoder comprises: a quantizer configured for quantizing the discrete cosine transform coefficients of the reference macro-block providing quantized discrete cosine transform coefficients of the reference macro-block; and a de-quantizer configured for inversely quantizing the quantized discrete cosine transform coefficients of the reference macro-block providing quantized/dequantized discrete cosine transform coefficients of the reference macro-block, wherein the residual signal processor is configured to deduct the quantized/dequantized discrete cosine transform coefficients of the reference macro-block from the discrete cosine transform coefficients of the current macro-block to provide the residual signal.

Packet loss protection of such a video encoder overcomes frame recovery of conventional H.264 encoding/decoding algorithms as well as H.264/AVC and H.264/SVC recovery frame (Golden frame) technology in networks with packet loss.

According to a sixth aspect, the invention relates to a video decoder for decoding a residual signal, the residual signal carrying a macro-block of one of a P frame and a B frame of a video frame sequence protected by the method according to the first aspect, the video decoder comprising: a de-quantizer configured for inversely quantizing the residual signal providing a residual signal macro-block; a motion compensator configured to determine a reference macro-block from the residual signal macro-block; a discrete cosine transformer configured to determine discrete cosine transform coefficients of the reference macro-block; and a decoding processor configured to provide a decoded macro-block based on the residual signal macro-block and a prediction signal macro-block, wherein the prediction signal macro-block corresponds to the reference macro-block when the residual signal carries a macro-block of a P frame and wherein the prediction signal macro-block is based on the discrete cosine transform coefficients of the reference macro-block when the residual signal carries a macro-block of a B frame.

Such a video decoder provides higher frame rates, smaller freezing times and higher Y-PSNR on receiver side versus packet loss probability than conventional video decoders.

In a first possible implementation form of the video encoder according to the sixth aspect, the video decoder comprises: a quantizer configured for quantizing the prediction signal macro-block providing a quantized prediction signal macro-block; and a de-quantizer configured for inversely quantizing the quantized prediction signal macro-block providing a quantized/dequantized prediction signal macro-block, wherein the decoding processor is configured to provide the decoded macro-block based on a sum of the residual signal macro-block and the quantized/dequantized prediction signal macro-block.

Packet loss protection of such a video decoder is improved with respect to conventional H.264, H.264/AVC and H.264/SVC encoding/decoding algorithms.

According to a seventh aspect, the invention relates to a random and burst packet loss protection method, where an input video frame sequence is divided into two and more interleaved video streams, which are encoded independently by a differential video codec, and where each or some video frame for each video frame subsequence is protected by a redundant B frame predicted from reference frames from another video frame subsequence.

In a first implementation form of the seventh aspect, reconstructed at the encoder side the protected video frame is a source video frame for redundant B frame encoding.

In a second implementation form of the seventh aspect, an amount of interleaved independent video streams is more than 2.

In a third implementation form of the seventh aspect, only a part of independent video streams is protected by redundant B frames.

In a fourth implementation form of the seventh aspect, only a part of frames from video sequences is protected by redundant B frames.

According to an eighth aspect, the invention relates to a redundant B frame decoding method, where a decoded redundant B frame replaces a lost protected frame in a decoder's reference frames buffer.

In a first implementation form of the eighth aspect, an amount of interleaved independent video streams is more than 2.

In a second implementation form of the eighth aspect, only a part of independent video streams is protected by redundant B frames.

In a third implementation form of the eighth aspect, only a part of frames from video sequences is protected by redundant B frames.

According to a ninth aspect, the invention relates to a protected P and redundant B frames decoding method, where all non-redundant video frames are displayed with a delay of one frame after decoding. This method allows displaying a protected video frame if it was lost during transmission and recovered afterwards based on redundant B frame decoding.

In a first implementation form of the ninth aspect, all non-redundant video frames are displayed without algorithmic delay after decoding. This method allows restoring a decoder state after a video frame loss without algorithmic delay.

In a second implementation form of the ninth aspect, quantized residual signals of protected and redundant B frames use the same quantization levels grid. This method allows exactly restoring a lost protected video frame based on a redundant frame.

In a third implementation form of the ninth aspect, predicted macro-blocks for protected P frames and redundant B frames are quantized with the same quantization parameter PRED_QP.

In a fourth implementation form of the ninth aspect, the quantization parameter PRED_QP equals to P_QP or P_QP shifted by −6 and P_QP is a protected video frame macro-block quantization parameter calculated by a protected frame bit rate control system.

In a fifth implementation form of the ninth aspect, quantized prediction (reference) macro-blocks with quantization parameter PRED_QP are used for protected and redundant B frame decoding.

In a sixth implementation form of the ninth aspect, an amount of interleaved independent video streams is more than 2.

In a seventh implementation form of the ninth aspect, only a part of independent video streams is protected by redundant B frames.

In an eighth implementation form of the ninth aspect, only a part of frames from video sequences is protected by redundant B frames.

According to a tenth aspect, the invention relates to a simplified protected P and redundant B frame encoding method, where a protected P frame macro-block is encoded without modifications and a redundant B frame macro-block is encoded with a quantization parameter B_QP calculated on the basis of a protected P frame macro-block quantization parameter QP.

In a first implementation form of the tenth aspect, the quantization parameters B_QP and QP are related according to: B_QP=QP+SHIFT and SHIFT>=0.

In a second implementation form of the tenth aspect, redundant B frame generation is prohibited for frames with periodic INTRA slices, which are used for decoder state recovery after a long period.

In a third implementation form of the tenth aspect, an amount of interleaved independent video streams is more than 2.

In a fourth implementation form of the tenth aspect, only a part of independent video streams is protected by redundant B frames.

In a fifth implementation form of the tenth aspect, only a part of frames from video sequences is protected by redundant B frames.

The methods, systems and devices described herein may be implemented as software in a Digital Signal Processor (DSP), in a micro-controller or in any other side-processor or as hardware circuit within an application specific integrated circuit (ASIC).

The invention can be implemented in digital electronic circuitry, or in computer hardware, firmware, software, or in combinations thereof, e.g. in available hardware of conventional mobile devices or in new hardware dedicated for processing the methods described herein.

BRIEF DESCRIPTION OF THE DRAWINGS

Further embodiments of the invention will be described with respect to the following figures, in which.

DETAILED DESCRIPTION

Figure 1:
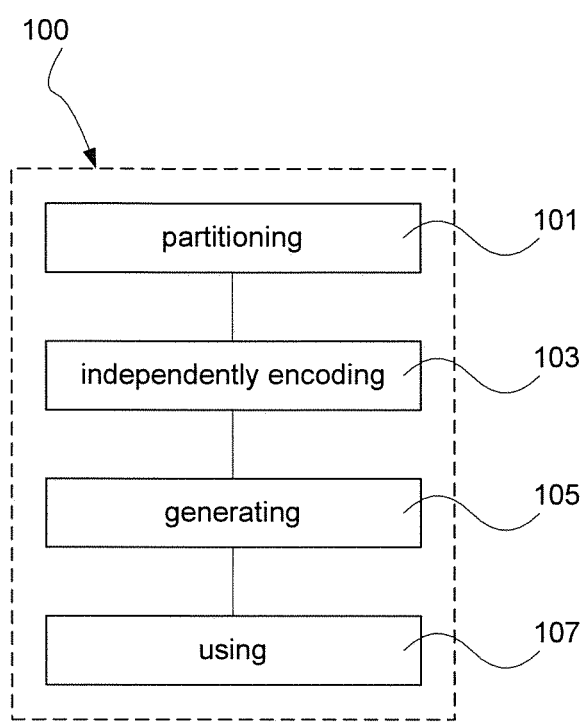
FIG. 1 shows a schematic diagram of a method for protecting a video frame sequence against random and/or burst packet losses according to an implementation form.

FIG. 1 shows a schematic diagram of a method 100 for protecting a video frame sequence against random and/or burst packet losses according to an implementation form. The method 100 comprises partitioning 101 the video frame sequence into a plurality of interleaved video frame subsequences; independently encoding 103 the plurality of interleaved video frame subsequences by a differential video codec; generating 105 for at least one of the plurality of interleaved video frame subsequences at least one B frame predicted from another one of the plurality of interleaved video frame subsequences; and using the at least one B frame as redundant B frame for protecting the video frame sequence.

Figure 2A:
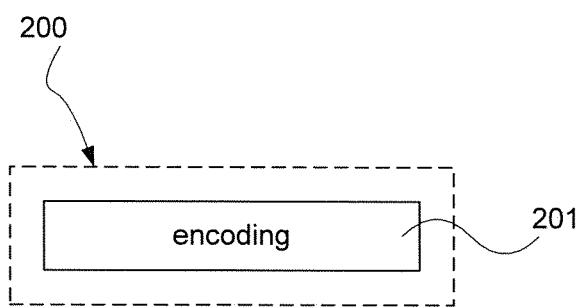
FIG. 2a shows a schematic diagram of a video frame encoding method according to an implementation form.

FIG. 2a shows a schematic diagram of a video frame encoding method 200 according to an implementation form. The video frame encoding method 200 comprises: encoding 201 the redundant B frame generated with the method 100 described above with respect to FIG. 1 based on a residual signal between a reconstructed video frame of one of the interleaved video frame subsequences and a prediction signal of a video frame of another one of the interleaved video subsequences.

In an implementation form, the video frame encoding method 200 comprises: quantizing the residual signal by using a quantization level grid, wherein the quantization level grid corresponds to a quantization level grid used for quantizing a residual signal for encoding a P frame of the video frame sequence. In an implementation form, the video frame encoding method 200 comprises: quantizing predicted macro-blocks of the P frame and the redundant B frame by using a same first quantization parameter PRED_QP. In an implementation form of the video frame encoding method 200, the first quantization parameter PRED_QP corresponds to a second quantization parameter P_QP used for quantizing a macro-block of the video frame sequence protected by the method 100 described above with respect to FIG. 1.

In an implementation form, the video frame encoding method 200 comprises: quantizing a macro-block of a P frame of the video sequence protected by the method 100 described above with respect to FIG. 1 by a third quantization parameter QP; and quantizing a macro-block of a redundant B frame of the video sequence protected by the method 100 described above with respect to FIG. 1 by a fourth quantization parameter B_QP calculated on a basis of the third quantization parameter QP. In an implementation form of the video frame encoding method 200, the fourth quantization parameter B_QP is a shifted version of the third quantization parameter QP.

Figure 2B:
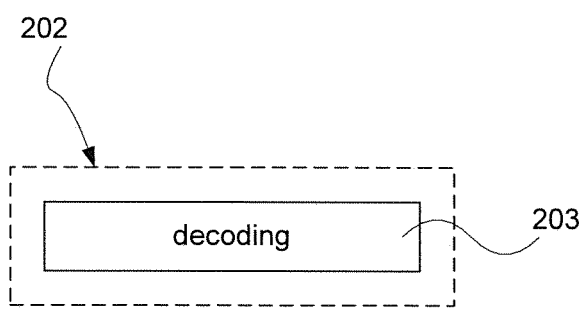
FIG. 2b shows a schematic diagram of a video frame decoding method according to an implementation form.

FIG. 2b shows a schematic diagram of a video frame decoding method 202 according to an implementation form. The video frame decoding method 202 comprises: decoding 203 a video frame sequence protected by the method 100 described above with respect to FIG. 1 by a differential video codec, wherein a lost video frame of the video frame sequence is replaced by a redundant B frame.

In an implementation form, the video frame decoding method 202 comprises: recovering the video frame sequence based on the redundant B frame; and displaying the recovered video frame sequence with a delay of one video frame after the decoding. In an alternative implementation form, the video frame decoding method 202 comprises: restoring a state of the decoding; and displaying non-redundant video frames without algorithmic delay after the decoding. In an implementation form of the video frame decoding method 202, the video frame sequence is decoded by using reference macro-blocks quantized with the first quantization parameter PRED_QP as described above with respect to FIG. 2a.

Figure 3:
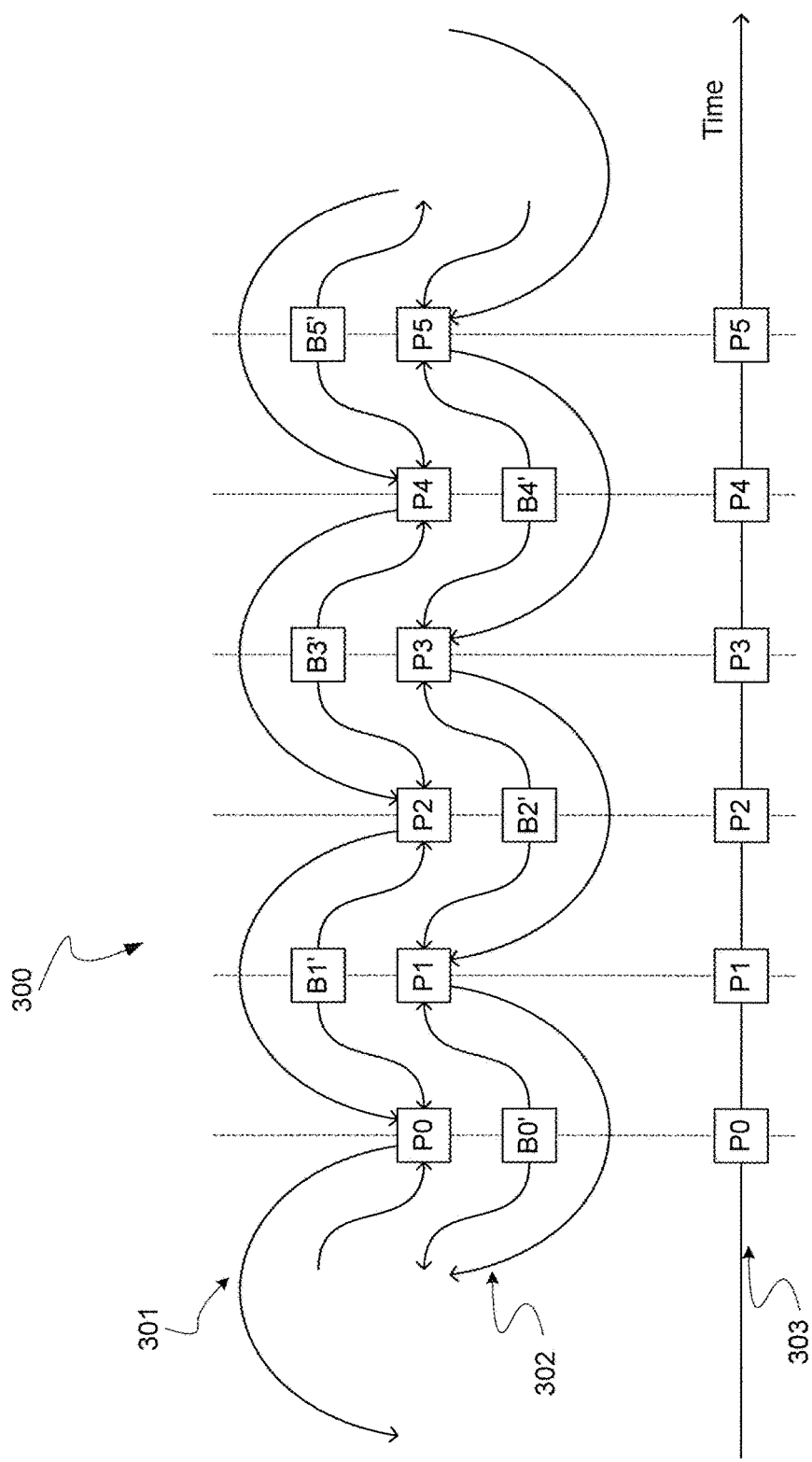
FIG. 3 shows a flowchart of a video encoder according to an implementation form.

FIG. 3 shows a flowchart 300 of a video encoder according to an implementation form where only two independent video frame streams 301, 302 are used and each frame is protected by a redundant B frame.

The input video sequence P0, P1, . . . , P4, P5 303 is divided into two interleaved video frame sequences P0, P2, P4 301 and P1, P3, P5 302. Then, the two video frame sequences are encoded independently by a differential video encoder.

For each input video frame a redundant B frame is generated. The B frame is used only for the regular P frame loss protection. This frame is decoded only if the corresponding protected P frame is lost during network transmission. Otherwise, this frame is not used and is discarded. If the B frame is generated for a first video frame sequence 301, then it is predicted from video frames of the second video frame sequence 302 and vice-versa. Such a redundant B frame can be used for a corrupted video sequence recovery if the other video stream sequence was not corrupted during transmission. Of course, the redundant B frame can be used for lost frame recovery, but the main purpose of the redundant B frames is decoder state recovery. So, redundant B frames can be rarely inserted into the video stream to reduce the redundancy of the encoded video stream.

If recovery frames with long links to reference pictures are used in each video frame sequence for fast decoder state recovery, then redundant B frames can be generated only for recovery frames to realize bit budget savings.

The dividing of the input video sequence P0, P1, . . . , P4, P5 into two interleaved video frame sub-sequences P0, P2, P4 301 and P1, P3, P5 302, the independently encoding of the two video frame sub-sequences, the generation of the redundant B frame and the using of the B frame for P frame loss protection may be performed by the method as described with respect to FIG. 1.

Two different decoding algorithms are applied for the described encoding algorithm. The first algorithm allows restoring and displaying lost protected P frames based on B frames, but it introduces algorithmic delay of one frame on the receiver side. The second algorithm allows only restoring the decoder state after protected P frame loss, but it doesn't allow recovered lost frame displaying. This algorithm doesn't introduce any algorithmic delay.

Figure 4:
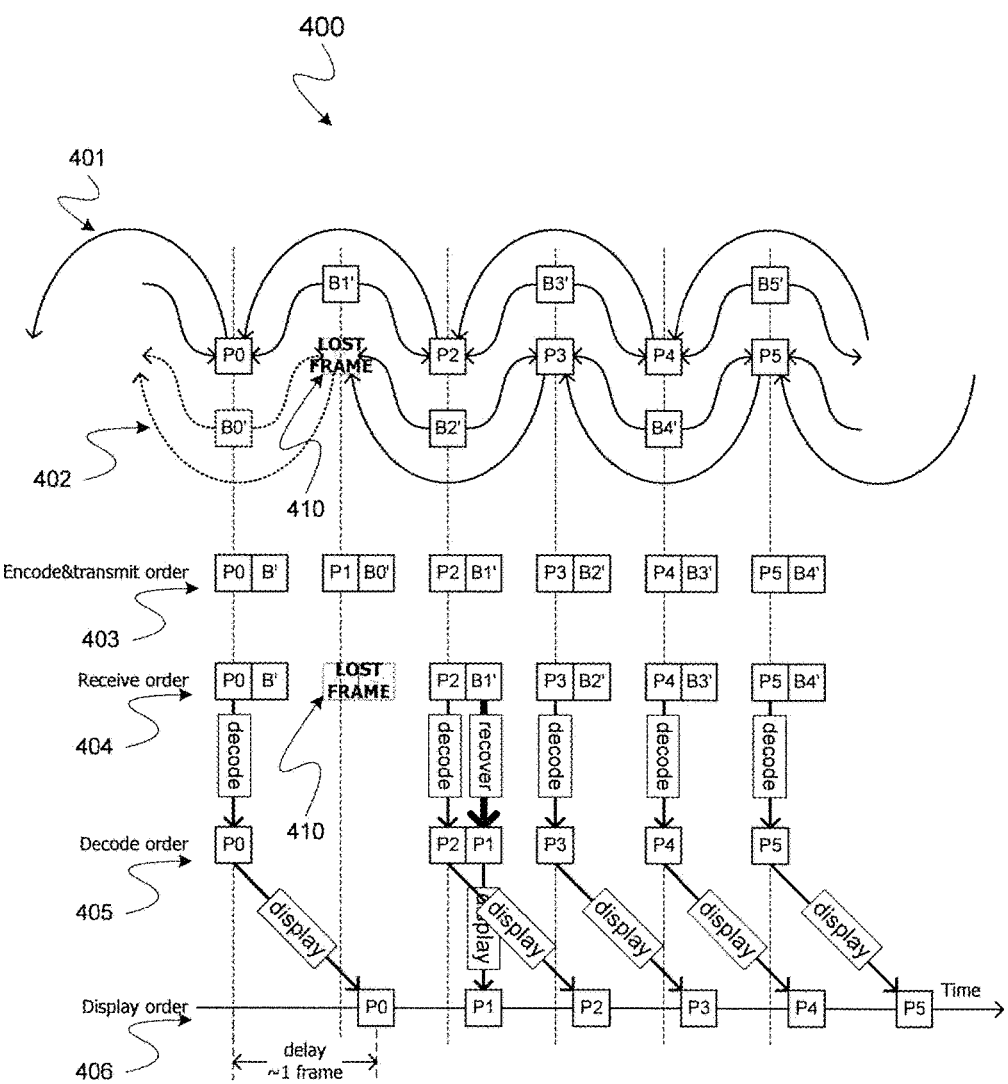
FIG. 4 shows a flowchart of a first decoding algorithm according to an implementation form.

FIG. 4 shows a flowchart 400 of a first decoding algorithm according to an implementation form. As described above with respect to FIG. 3, two independent video frame streams 401, 402 are used and each frame is protected by a redundant B frame. According to this first decoding algorithm all regular P frames P0, P1, P2, P3, P4 and P5 are displayed with a delay of one frame after frame decoding 405. If a frame is lost 410, the first decoding algorithm allows displaying 406 recovered frames based on received redundant B frames.

The first video frame stream 401 with P frames P0, P2, P4 and redundant B frames B1', B3', B5' and the second video frame stream 402 with P frames P1, P3, P5 and redundant B frames B0', B2', B4' are encoded as redundant video frame stream 403 with the elements (P0, B'), (P1, B0'), (P2, B1'), (P3, B2'), (P4, B3'), (P5, B4'). If one element, e.g. (P1, B0') in receive video frame stream 404 is lost 410, that lost element 410 is reconstructed by a redundant B frame of another element in receive video frame stream 404, e.g. by the next element (P2, B1'). The decoded video frame stream 405 thus comprises the P frames of the original video frame stream P0, P1, P2, P3, P4 and P5, yet in a different order. By reconstructing the display order 406, the original video frame stream P0, P1, P2, P3, P4 and P5 can be correctly displayed. The first decoding algorithm is an implementation form of the method 100 as described with respect to FIG. 1. The encoding to redundant video frame stream 403 may correspond to the encoding as described with respect to FIG. 2a. The decoding to decoded video frame stream 405 may correspond to the decoding as described with respect to FIG. 2b.

Figure 5:
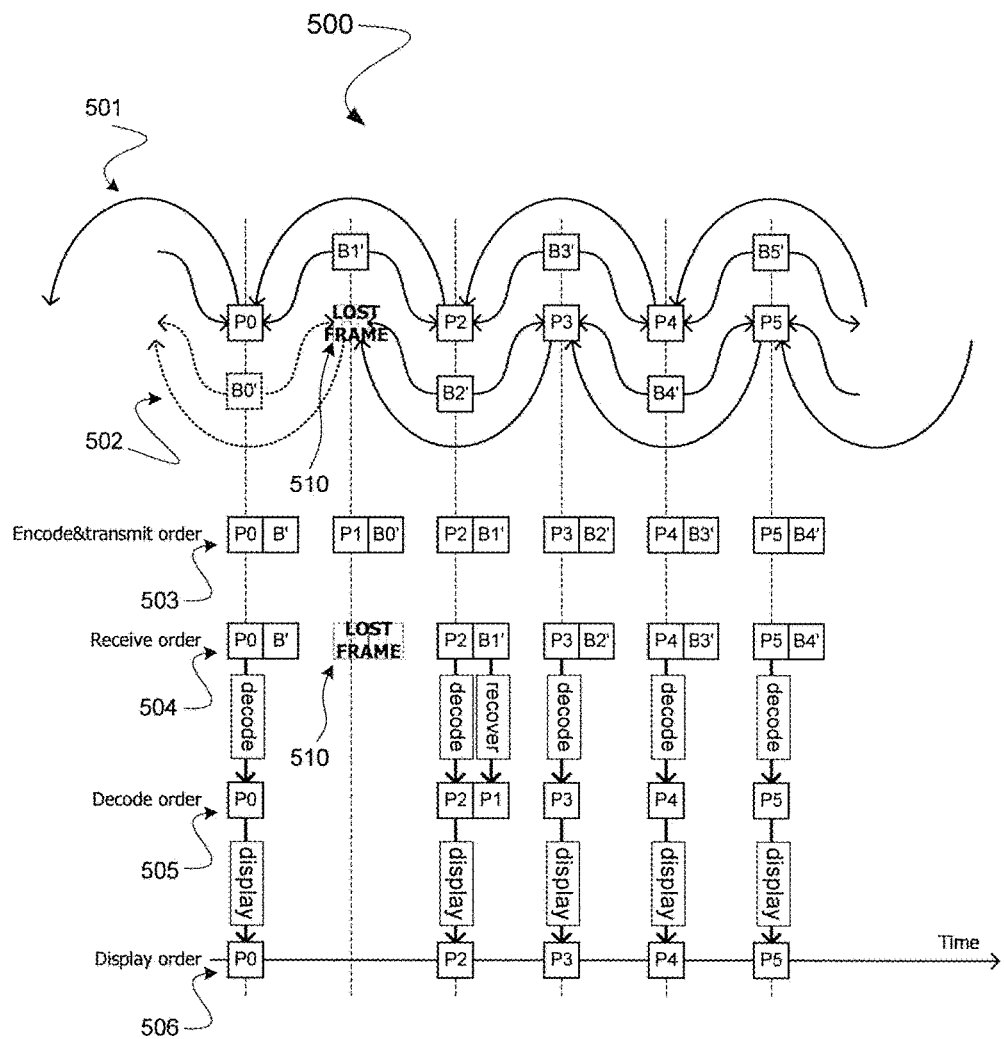
FIG. 5 shows a flowchart of a second decoding algorithm according to an implementation form.

FIG. 5 shows a flowchart 500 of a second decoding algorithm according to an implementation form. According to this second algorithm, the decoded video frames 505 are displayed immediately after decoding. In this case, the recovered frame, e.g. P1 according to FIG. 5, cannot be displayed because it is restored only at the moment when the next frame, e.g. P3 according to FIG. 5, is to be displayed. So, the second decoding algorithm is preferably used for decoder state recovery.

As described above with respect to FIG. 3, two independent video frame streams 501, 502 are used and each frame is protected by a redundant B frame. According to this second decoding algorithm all regular P frames P0, P1, P2, P3, P4 and P5 are displayed without a delay after frame decoding 505. If a frame is lost 510, the corresponding P frame is not displayed. The first video frame stream 501 with P frames P0, P2, P4 and redundant B frames B1', B3', B5' and the second video frame stream 502 with P frames P1, P3, P5 and redundant B frames B0', B2', B4' are encoded as redundant video frame stream 503 with the elements (P0, B'), (P1, B0'), (P2, B1'), (P3, B2'), (P4, B3'), (P5, B4'). If one element, e.g. (P1, B0') in receive video frame stream 504 is lost 510, that lost element 510 is discarded. The decoded video frame stream 505 comprises the P frames of the original video frame stream P0, P1, P2, P3, P4 and P5, yet in a different order. As reconstructing the display order would require delaying the sequence, the second algorithm just discards elements being out of order for avoiding inserting delays. The original video frame stream P0, P1, P2, P3, P4 and P5 is displayed 506 without the lost element P1.

The second decoding algorithm is an implementation form of the method 100 as described with respect to FIG. 1. The encoding to redundant video frame stream 503 may correspond to the encoding as described with respect to FIG. 2a. The decoding to decoded video frame stream 505 may correspond to the decoding as described with respect to FIG. 2b.

For the described above video stream, encoding and decoding algorithms implement a modified version of the general differential video codecs (H.264, HEVC). Two different encoders for packet loss video stream protection are presented in the following. The first encoder allows exactly restoring the corrupted video sequence if another video sequence was received without corruption. The second encoder allows approximately restoring the corrupted video sequence if another video sequence was received without corruption. In both cases, a redundant B frame encoding procedure which is modified with respect to the regular B frame encoding procedure according to the description below with respect to FIG. 6 can be used.

Figure 6:
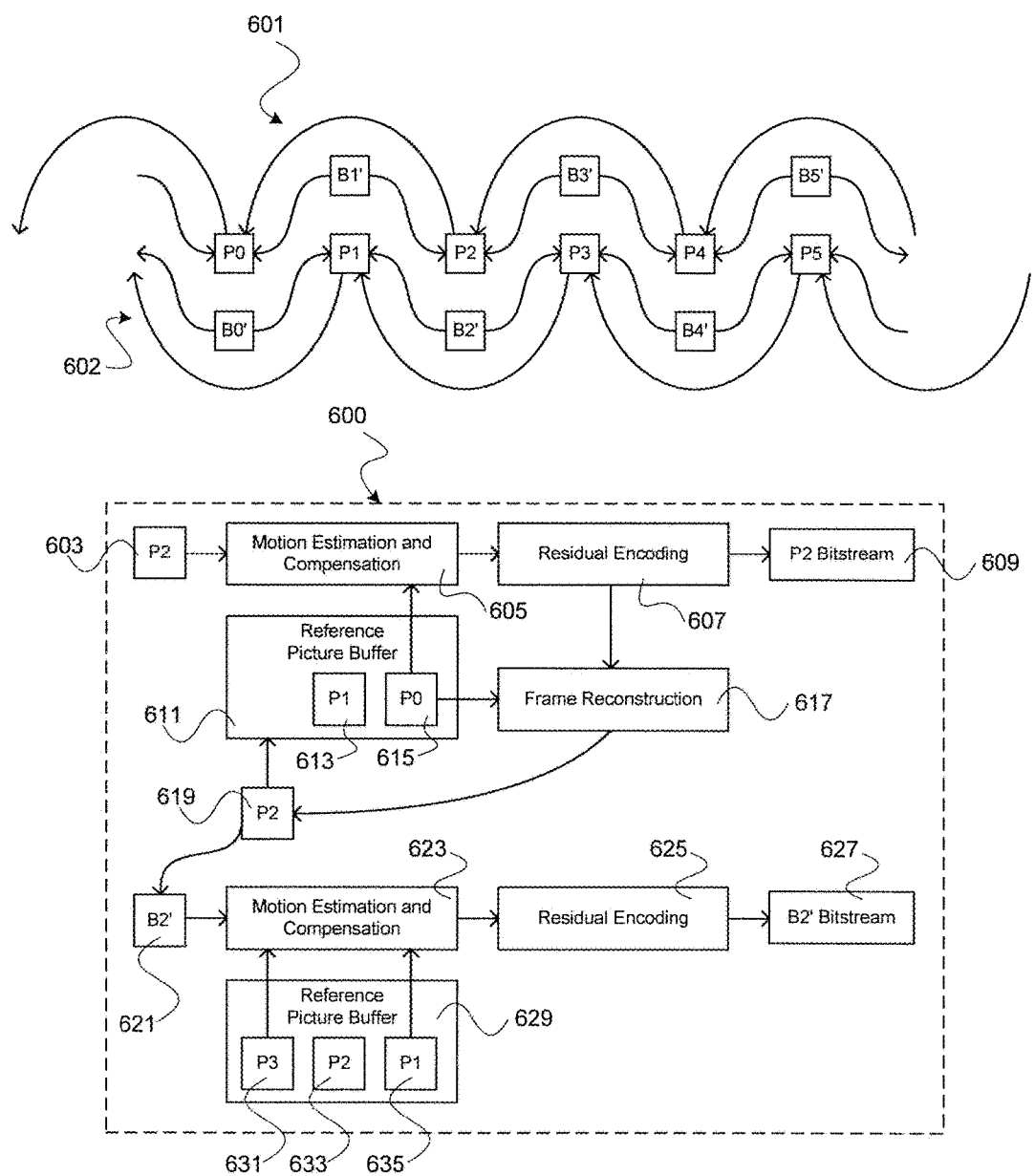
FIG. 6 shows a high level flowchart of a video encoder according to an implementation form.

FIG. 6 shows a high level flowchart of a video encoder according to an implementation form. When a regular B frame is encoded, the residual signal is calculated between the input video frame and the prediction signal which is derived from the video frames of the same video frame sequence and which includes B frame being encoded. Opposed to the regular B frame encoding process, for the redundant B frame the residual signal is calculated between the reconstructed protected P frame of one video frame sequence and the prediction signal derived from the video frames of some other video frame sequence. As described above with respect to FIGS. 4 and 5, two different encoding procedures for protected P and redundant B frame are applied. The first encoding procedure allows exactly restoring the corrupted video frame stream. The second one allows approximately restoring the corrupted video frame stream.

According to FIG. 6, a received P frame P2 603 is provided to motion estimation and compensation unit 605 which performs motion estimation and compensation with respect to the received P frame 603 and a P frame P1 615 in a reference picture buffer 611 to obtain a residual signal which is encoded in a residual encoding unit 607 providing a P2 bitstream 609. A frame reconstruction unit 617 provides a P frame P2 619 which is stored in the reference picture buffer 611. The P frame P2 619 is used for generating a redundant B frame B2' 621. The redundant B frame B2' 621 is provided to motion estimation and compensation unit 623 which performs motion estimation and compensation with respect to the redundant B frame B2' 621 and P frames P3 631 and P1 635 in a reference picture buffer 629 to obtain a residual signal which is encoded in a residual encoding unit 625 providing a B2' bitstream 627.

Figure 7:
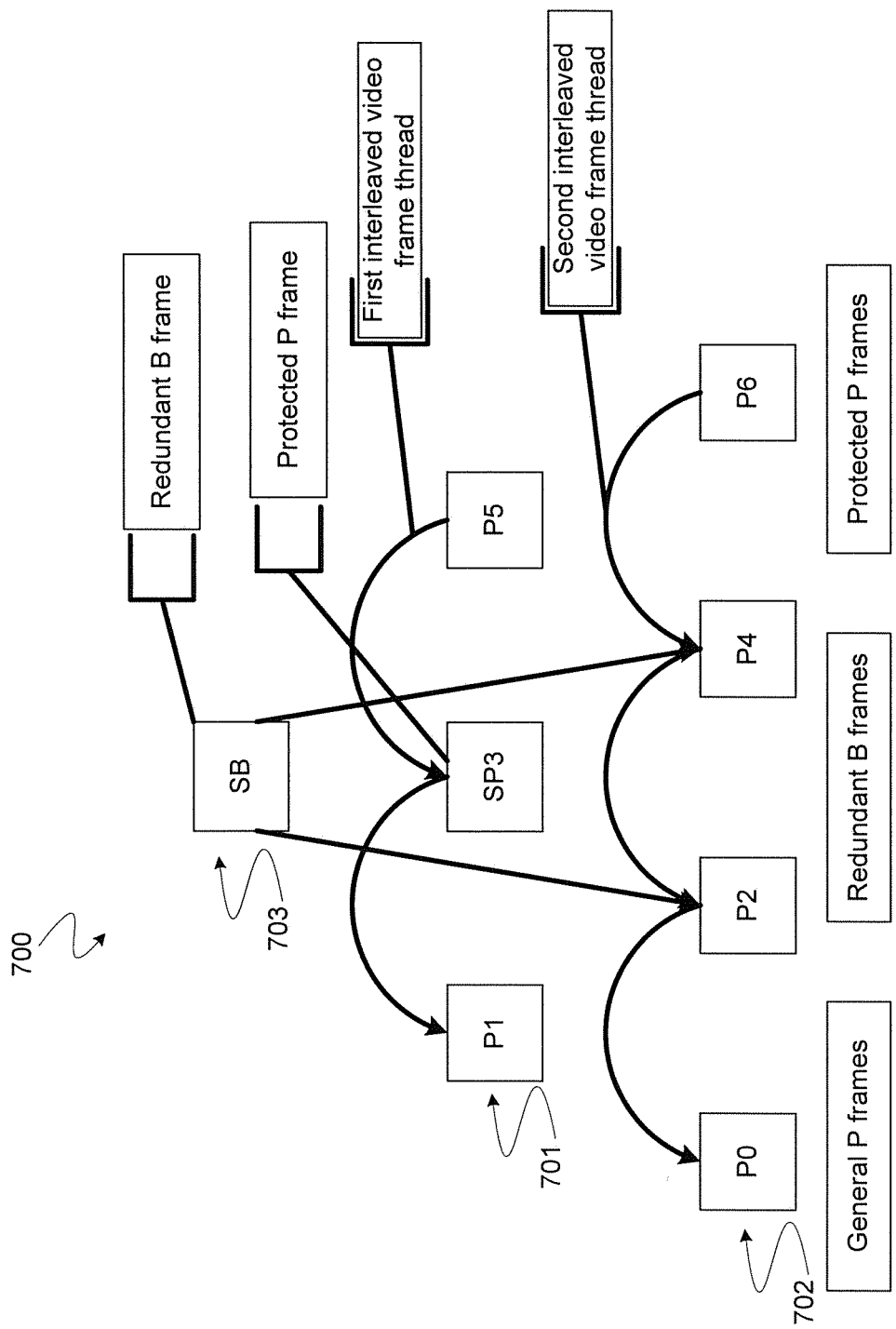
FIG. 7 shows a schematic diagram of an encoder procedure for exact lost frame reconstruction according to an implementation form.

FIG. 7 shows a schematic diagram of an encoder procedure for exact lost frame reconstruction according to an implementation form. In this figure, P1, SP3, P5 are encoded input video frames from the first independent interleaved video sequence 701. P0, P2, P4, P6 are encoded input video frames from the second independent interleaved video sequence 702. SB is an encoded redundant B frame 703 protecting three frames of the first video frames sequence 701. Frames P1, P5, P0, P2, P4, P6 are encoded as regular P frames. Reference frames are chosen from the first video sequence 701 for all odd input frames while all even input frames use reference frames from the second video sequence 702. The encoding procedure for protected frame SP3 and redundant B frame SB is described in the following with respect to FIGS. 8 and 9.

Figure 8:
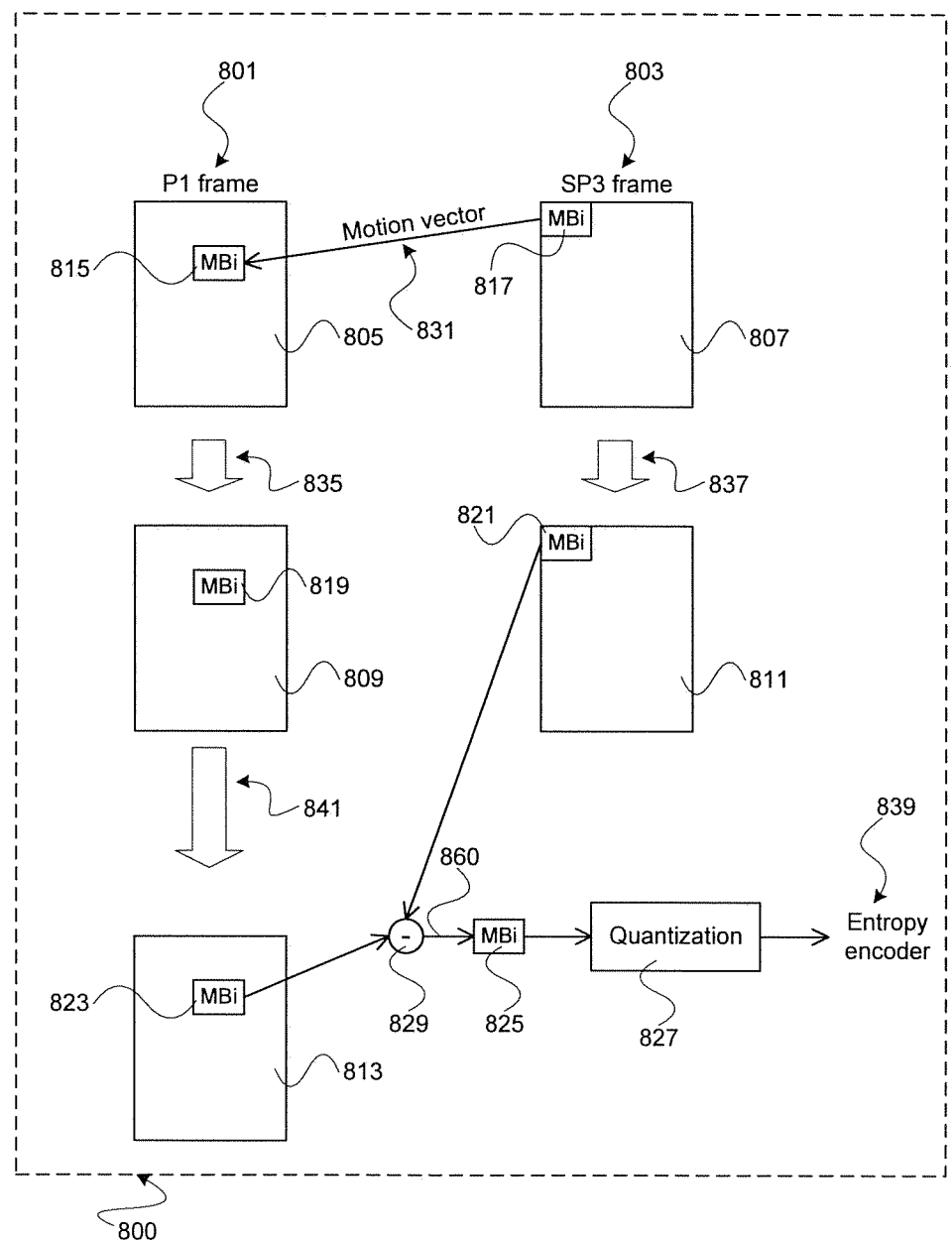
FIG. 8 shows a flow chart for protected P frame encoding according to an implementation form.

FIG. 8 shows a flow chart for protected P frame encoding according to an implementation form. An encoding procedure for protecting three frames of a first input video frame sequence as described above with respect to FIG. 7 is depicted. For each macro-block of a protected P frame (SP3) 803, the following operations are performed. First, motion compensation procedure is performed and corresponding motion vectors 831 are determined. MBi 817 in SP3 frame 803 is denoted as the i-th macro-block of protected P frame 803. The encoder rate control system chooses a quantization parameter for the current macro-block as P_QP(i). A DCT transform 837 is performed for the macro-block 817 of protected P frame 807 and a DCT transform 835 is performed for the macro-block 815 of the reference frame 805. The quantization parameter for the macro-block 819 of the reference frame 809 is set as PRED_QP(i)=P_QP(i) or set as P_QP(i)-6, i.e. P_QP(i) shifted by 6 bits. The DCT coefficients of the reference macro-block 819 are quantized and then de-quantized by using the quantization parameter PRED_QP(i) obtaining the macro-block 823 of the reference frame 813. The residual signal 860 between the DCT coefficients of the macro-block 821 of the protected P frame 811 and the quantized/de-quantized DCT coefficients the macro-block 823 of the reference frame 813 are calculated, e.g. by a deduction operation 829 obtaining a quantized/dequantized macro-block 825 which is quantized 827 with the quantization parameter P_QP(i). The quantized residual signal after quantization 825 is encoded by an entropy encoder 839.

Figure 9:
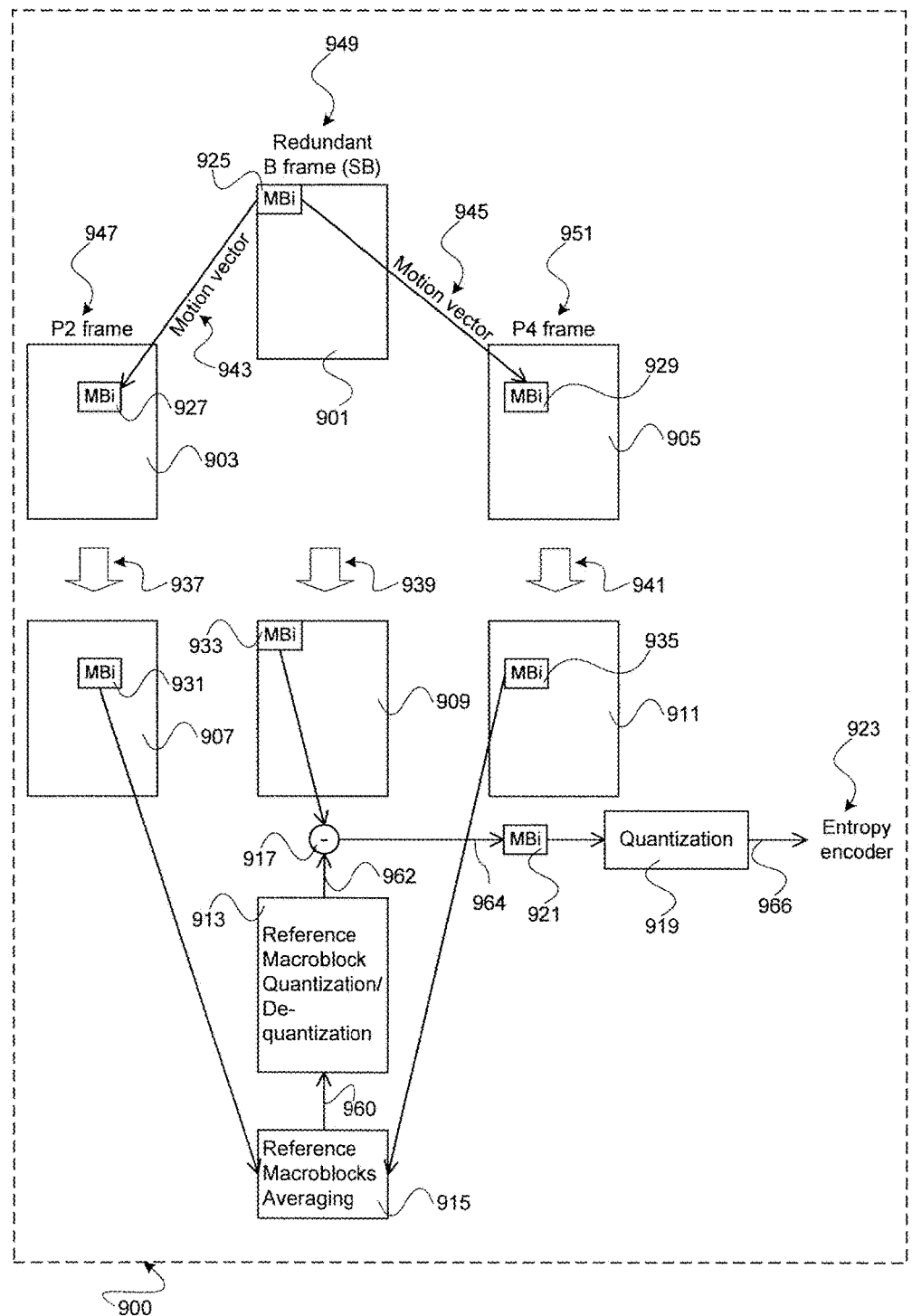
FIG. 9 shows a flow chart for redundant B frame encoding according to an implementation form.

FIG. 9 shows a flow chart for redundant B frame encoding according to an implementation form. The redundant B frame (SB) 949 is used for protecting three input video frames of the first video frame sequence. According to this procedure for each i-th macro-block 925 of redundant B frame 901 the following procedure is performed. First, motion compensation procedure is performed and corresponding motion vectors 943, 945 are determined from reference frames P2 947 and P4 951. The DCT coefficients for the macro-block 925 of the redundant B frame 901 are determined by applying a DCT transform 939. The DCT coefficients for the macro-block 927 of the P2 frame 903 are determined by applying a DCT transform 937. The DCT coefficients for the macro-block 929 of the P4 frame 905 are determined by applying a DCT transform 941. The DCT coefficients of the reference macro-blocks 931, 935 are averaged 915 to produce the prediction signal 960 for the redundant B frame macro-block. The DCT coefficients of the prediction signal 960 are quantized/de-quantized 913 with quantization parameter PRED_QP(i) determined during encoding of the corresponding macro-block from the protected P frame. The residual signal 964 between DCT coefficients of redundant B frame 909 and quantized/dequantized prediction signal 962 are determined and quantized 919 with the quantization parameter PRED_QP(i). The quantized residual signal 966 is encoded by an entropy encoder 923.

Figure 10:
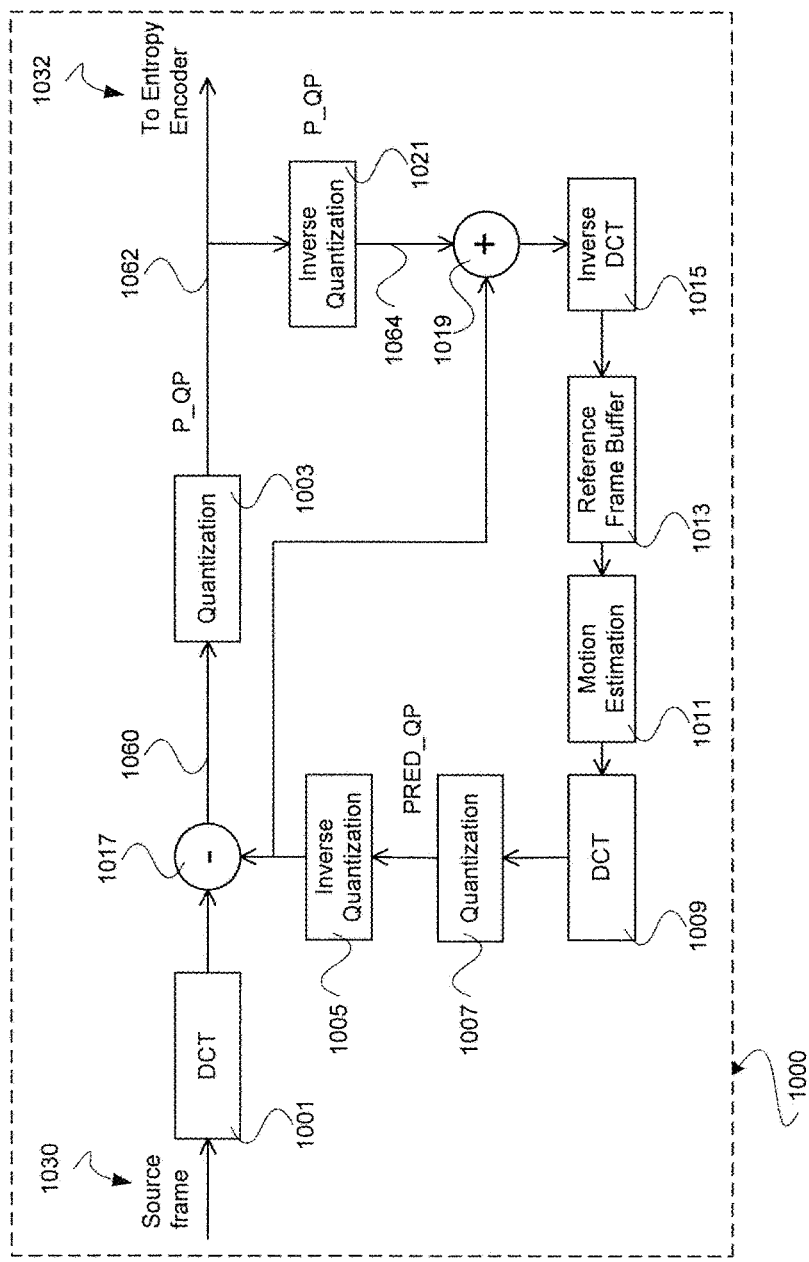
FIG. 10 shows a flow chart of an encoder for protected P and redundant B frames according to an implementation form.

FIG. 10 shows a flow chart of an encoder 1000 for protected P and redundant B frames according to an implementation form. In an implementation form, the encoder 1000 implements the encoding corresponding to the encoding procedures described above with respect to FIGS. 8 and/or 9. The P frames P1, P5, P0, P2, P4 and P6 are decoded as regular P frames according to the description above with respect to FIG. 7. The protected P frame (SP3) and the redundant B (SB) frame is thus modified relative to the conventional procedure used in modern differential video codecs.

The video encoder 1000 comprises a motion compensator 1011 configured to determine a motion vector from a reference macro-block of the video frame sequence. The reference macro-block is stored in a reference frame buffer 1013. The video encoder 1000 comprises two discrete cosine transformers 1009, 1001 configured to determine discrete cosine transform coefficients of the reference macro-block and configured to determine discrete cosine transform coefficients of a current macro-block which is a macro-block of one of a P frame and a B frame of the video frame sequence. The video encoder 1000 comprises a residual signal processor 1017 configured to provide a residual signal 1060 based on the discrete cosine transform coefficients of the current macro-block and the discrete cosine transform coefficients of the reference macro-block. The residual signal 1060 is encoding the video frame sequence.

The video encoder 1000 comprises a first quantizer 1007 configured for quantizing the discrete cosine transform coefficients of the reference macro-block providing quantized discrete cosine transform coefficients of the reference macro-block. The video encoder 1000 comprises a first de-quantizer 1005 configured for inversely quantizing the quantized discrete cosine transform coefficients of the reference macro-block providing quantized/dequantized discrete cosine transform coefficients 1058 of the reference macro-block. First quantizer 1007 and first de-quantizer 1005 are quantizing the respective macro-blocks by applying a quantization parameter PRED_QP. The residual signal processor 1017 is configured to deduct the quantized/dequantized discrete cosine transform coefficients of the reference macro-block from the discrete cosine transform coefficients of the current macro-block to provide the residual signal 1060.

The video encoder 1000 comprises a second quantizer 1003 and a second de-quantizer 1021. The second quantizer 1003 is configured for quantizing the residual signal 1060 providing a quantized residual signal 1062 to an entropy encoder 1032. The second de-quantizer 1021 is configured for inverse quantizing the quantized residual signal 1062 providing a quantized/de-quantized residual signal 1064. Second Quantizer 1003 and second de-quantizer 1021 are quantizing the respective macro-blocks by applying a quantization parameter P_QP. An adder 1019 is used for adding the quantized/dequantized discrete cosine transform coefficients 1058 of the reference macro-block and the quantized/de-quantized residual signal 1064 for providing a sum signal to a second inverse DCT unit 1015 which is coupled with its output to the reference frame buffer 1013.

Figure 11:
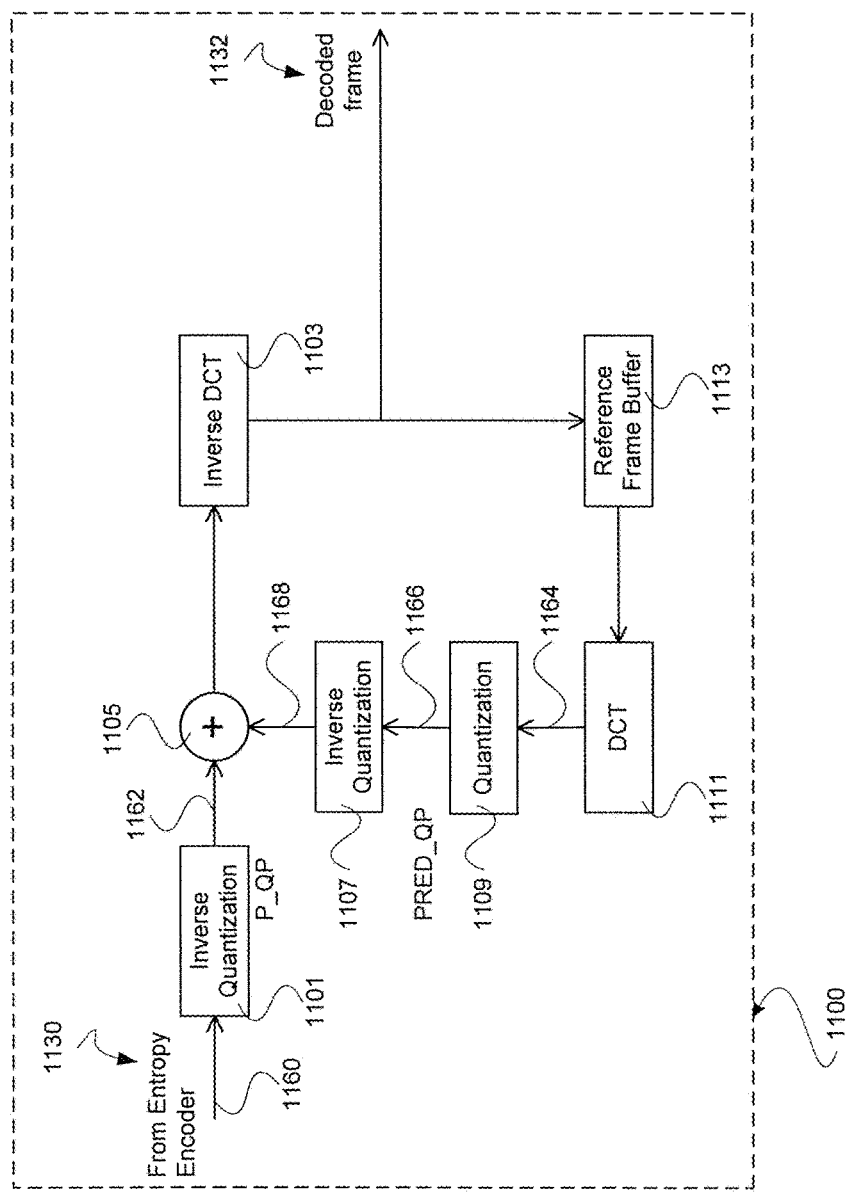
FIG. 11 shows a flow chart of a decoder for protected P and redundant B frames according to an implementation form.

FIG. 11 shows a flow chart of a decoder 1100 for protected P and redundant B frames according to an implementation form. The video decoder 1100 is decoding a residual signal 1160 carrying a macro-block of one of a P frame and a B frame of a protected video frame sequence, e.g. protected by the method 100 as described with respect to FIG. 1. The video decoder 1100 comprises a de-quantizer 1101 configured for inversely quantizing the residual signal 1060 providing a residual signal macro-block 1062. The video decoder 1100 comprises a motion compensator configured to determine a reference macro-block from the residual signal macro-block. The video decoder 1100 comprises a discrete cosine transformer 1111 configured to determine discrete cosine transform coefficients of the reference macro-block. The video decoder 1100 comprises a decoding processor 1105 configured to provide a decoded macro-block based on the residual signal macro-block 1162 and a prediction signal macro-block 1164. The prediction signal macro-block 1064 corresponds to the reference macro-block when the residual signal carries a macro-block of a P frame. The prediction signal macro-block 1064 is based on the discrete cosine transform coefficients of the reference macro-block when the residual signal carries a macro-block of a B frame. The video decoder 1100 further comprises a quantizer 1109 configured for quantizing the prediction signal macro-block 1164 providing a quantized prediction signal macro-block

1166. The video decoder 1100 comprises a de-quantizer 1107 configured for inversely quantizing the quantized prediction signal macro-block 1166 providing a quantized/dequantized prediction signal macro-block 1168. The decoding processor 1105 is configured to provide the decoded macro-block based on a sum of the residual signal macro-block 1162 and the quantized/dequantized prediction signal macro-block 1168. The decoded macro-block is provided to an inverse DCT transform 1103 to obtain the DCT coefficients of the decoded frame 1132 which are also provided to a reference frame buffer 1113 buffering the reference macro-block.

According to the decoding procedure applied by the video decoder 1100, for each i-th macro-block of protected P or redundant B frame the following procedure is performed. The quantized residual signal is de-quantized with quantization parameter P_QP(i) for protected P frame and with quantization parameter PRED_QP(i) for redundant B frame. The motion compensation procedure is performed and a corresponding reference macro-block for protected P frame or for reference macro-blocks for redundant B frame is determined. DCT coefficients for the reference macro-block or the reference macro-blocks are calculated. If the redundant B frame is to be decoded, then DCT coefficients of the reference macro-blocks are averaged to produce the prediction signal for the redundant B frame macro-block. If the protected P frame is to be decoded then the prediction signal macro-block equals to the reference picture macro-block. The prediction signal macro-block is quantized/de-quantized with the quantization parameter PRED_QP(i). DCT coefficients of the macro-block being decoded are determined as sum of the prediction signal macro-block and the residual signal macro-block. The inverse DCT transformation is performed for obtaining the DCT coefficients of the decoded macro-block. The decoded macro-block is passed to a standard differential video codec for any additional processing such as de-blocking, storing in reference buffer, etc.

In an implementation form, the decoder 1100 is used for implementing a simplified encoding and decoding procedure which allows approximately restoring lost frame. The simplified encoding algorithm is used for bit budget savings and providing flexible trade-off between coding efficiency in networks with and without packet loss. According to the simplified algorithm, a protected P frame is encoded as a regular P frame in a conventional differential video codec without being modified. The redundant B frame encoder is modified. During frame prediction the encoder uses not the original input frame, but its reconstructed (distorted by the quantization, etc) version which is produced inside the P frame encoder to get the reference frame for further inter prediction. The P frame quantization parameter QP is chosen by the encoder bit rate control algorithm. The redundant B frame quantization parameter is chosen on the basis of the P frame quantization parameter QP for a corresponding macro-block. In an implementation form, the redundant B frame quantization parameter is set as QP+Shift, where Shift is a shift value which enables flexible trade-off between coding efficiency in networks without packet loss and error propagation in networks with packet loss. The standard decoding procedure for P and B frames is used on receiver side for the protected P and redundant B frame. The redundant B frame decoding procedure is performed only if a corresponding protected P frame was lost. In this case, a recovered P frame is placed into the reference frame buffer instead of a "non-existing" placeholder P frame as defined by the H.264 specification. The decoding algorithms described above allow fully restoring the decoder state if at least one of the independent interleaved video sequences is uncorrupted after transmission. In an implementation form, periodic INTRA slices are used for the decoder state recovery when all independent interleaved video sequences are corrupted. In an implementation form, redundant B frame generation is prohibited during periodic INTRA slice transmission for improving the coding efficiency.

As described above with respect to FIGS. 3, 4 and 5, the decoder and encoder are processing two independent interleaved video streams. Encoding and decoding procedures, however, can be extended for three, four and more independent video streams. Especially in this case, the algorithm is very robust against burst packet loss. The encoder described above with respect to FIG. 10 protects all P frames in all independent video streams. In an implementation form, redundant B frames are inserted with long period. In an implementation form, redundant B frames are used to protect only small parts of the P frames. Both of these implementation forms increase coding efficiency, for example, when recovery frames are used for packet loss robustness and redundant B frames are used for recovery frames protection only. In an implementation form, rare redundant B frame insertion is used as alternative for INTRA frame transmission for decoder state recovery. Bit budget used for redundant B frame encoding is less than for INTRA frame encoding.

Figure 12:
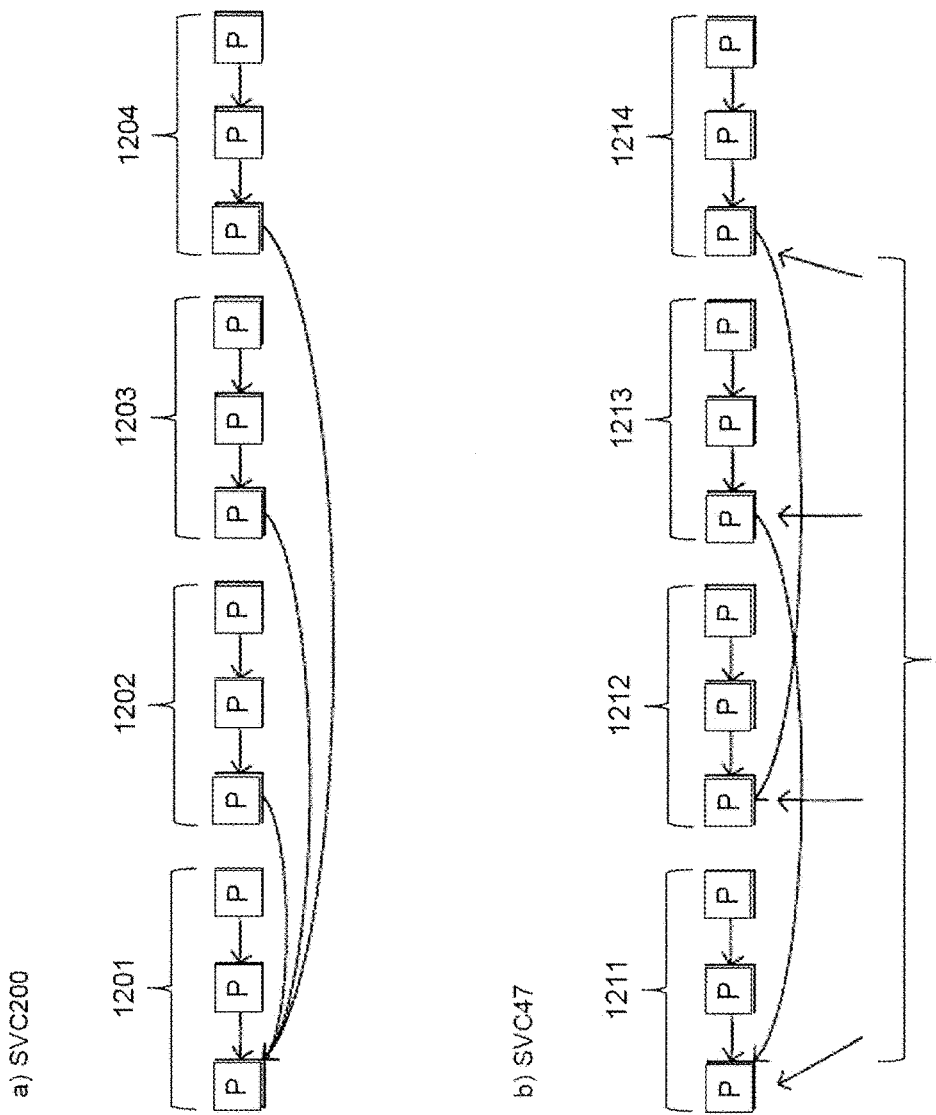
FIG. 12 shows a schematic diagram of video frame streams used for simulation and comparison according to an implementation form.

FIG. 12 shows a schematic diagram of video frame streams used for simulation and comparison according to an implementation form. To evaluate the performance of the video encoders and video decoders described above, simulation results of a simulation performed for network channel with random packet loss are presented in FIG. 12. FIG. 12 shows the inter-prediction referencing structure of video frame streams configurations which were chosen for simulation and comparison.

SVC200 depicted in FIG. 12 *a*) is a video frame stream configuration, which uses the so called Golden/Recovery frames technology for packet loss protection. This technology is used for example in the H.264/SVC standard. In FIG. 12, four blocks 1201, 1202, 1203, 1204 of three P frames are processed. SVC47 which is depicted in FIG. 12 *b*) and SVC37 and SVC27 which are not depicted are video frame stream configurations which use packet loss protection algorithm as described above with respect to FIGS. 1 to 11 for protecting the blocks 1211, 1212, 1213 and 1214 of P frames. A simplified redundant B frame encoding algorithm as described above with respect to FIG. 11 is used. The quantization parameter shift is chosen to be 15. In all video frame stream configurations periodic INTRA slices are used for full decoder state recovery.

Figure 13:
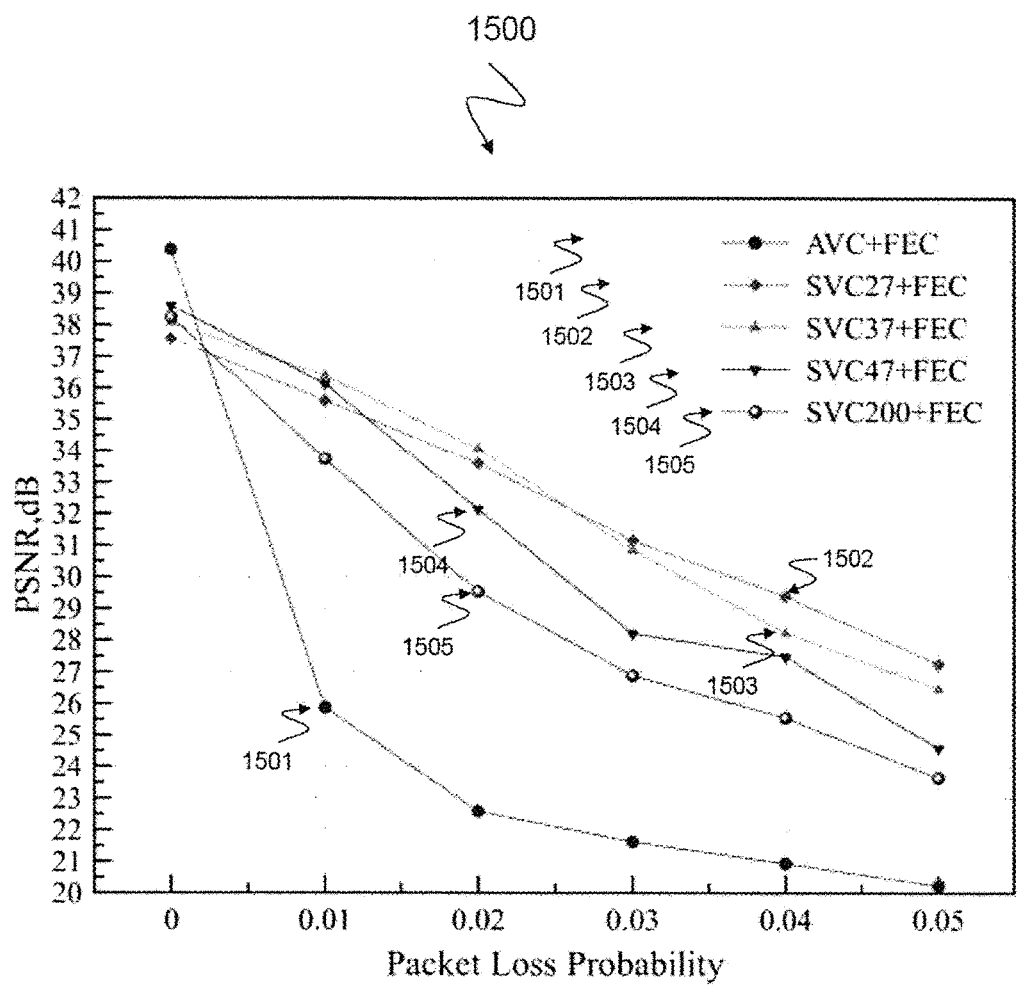
FIG. 13 shows a performance diagram illustrating an average Y-PSNR on receiver side of a method for protecting a video frame sequence according to an implementation form.
Figure 14:
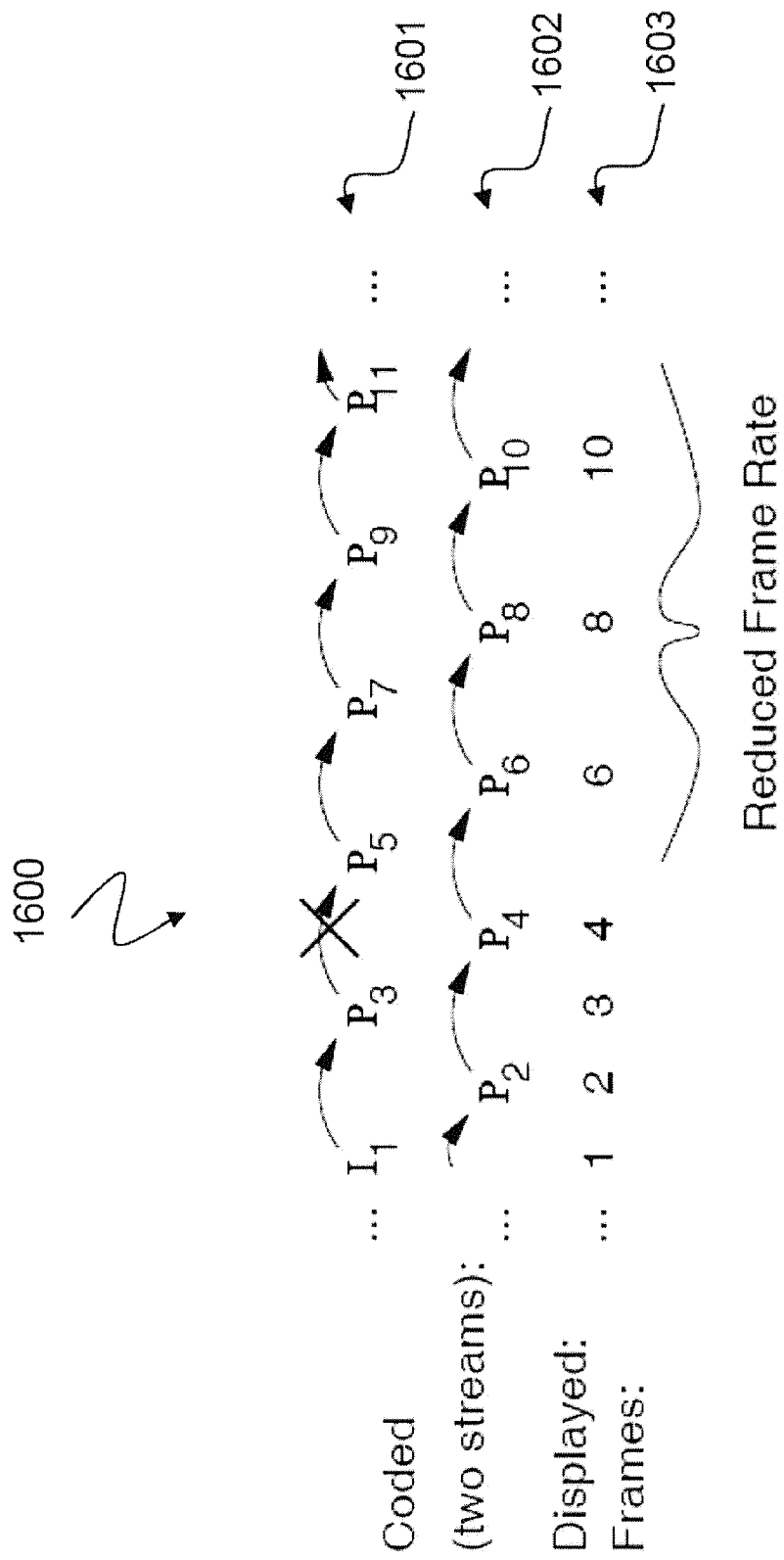
FIG. 14 shows a flow chart depicting a conventional interleaved source coding algorithm.
Figure 15:
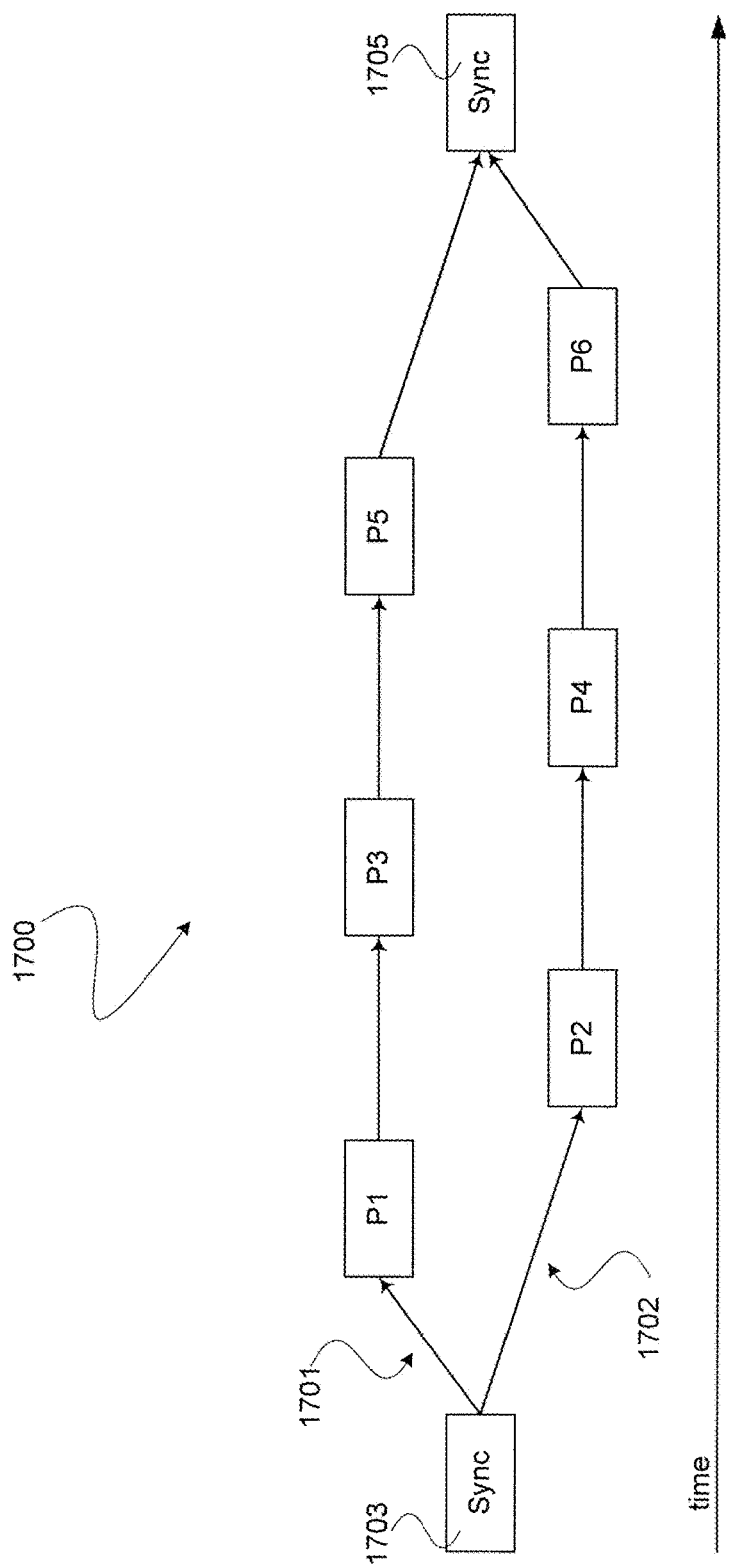
FIG. 15 shows a flow chart depicting a conventional video redundancy coding algorithm.

FIG. 13 shows a performance diagram 1500 illustrating an average Y-PSNR on receiver side of a method for protecting a video frame sequence according to an implementation form. The diagram 1500 shows average Y-PSNR in dB over packet loss probability on the receiver side when a video is transmitted over a packet network with and without packet loss. If a video frame had been lost on the receiver side, then the Y-PSNR is calculated between source video frame and the last correctly decoded video frame. The first curve 1501 depicts the H.264/AVC configuration, the second curve 1502 depicts the SVC27 configuration, the third curve 1503 depicts the SVC37 configuration, the fourth curve 1504 depicts the SVC47 configuration and the fifth curve 1505 depicts the SVC200 configuration. All configurations use forward error correction (FEC).

The simulation results show that packet loss protection technology as described above with respect to FIGS. 1 to 12 overcomes drawbacks of conventional H.264 encoding/decoding algorithm (video frame stream configuration IPPPPPPP) as well as H.264/AVC and H.264/SVC recovery frame (Golden frame) technology in networks with packet loss. An improvement has been observed for all measured parameters. For a channel without packet loss both, the algorithms described with respect to FIGS. 1 to 12 have comparable performances to golden/recovery frame algorithms.

From the foregoing, it will be apparent to those skilled in the art that a variety of methods, systems, computer programs on recording media, and the like, are provided.

The present disclosure also supports a computer program product including computer executable code or computer executable instructions that, when executed, causes at least one computer to execute the performing and computing steps described herein.

Many alternatives, modifications, and variations will be apparent to those skilled in the art in light of the above teachings. Of course, those skilled in the art readily recognize that there are numerous applications of the invention beyond those described herein. While the present inventions has been described with reference to one or more particular embodiments, those skilled in the art recognize that many changes may be made thereto without departing from the scope of the present invention. It is therefore to be understood that within the scope of the appended claims and their equivalents, the inventions may be practiced otherwise than as specifically described herein.

What is claimed is:

1. A method for protecting a video frame sequence against random and/or burst packet losses, the method comprising:
partitioning the video frame sequence into a plurality of interleaved video frame subsequences;
independently encoding the plurality of interleaved video frame subsequences by a differential video codec;
generating for at least one of the plurality of interleaved video frame subsequences at least one B frame predicted from another one of the plurality of interleaved video frame subsequences; and
using the generated at least one bidirectionally predictive coded picture frame (B frame) as a redundant B frame to replace a corresponding predictive coded picture frame (P frame) in the video frame sequence when a portion of the video frame sequence corresponding to the P frame is corrupted or lost, for protecting the video frame sequence.

2. The method of claim 1, further comprising:
encoding the redundant B frame generated based on a residual signal between a reconstructed video frame of one of the interleaved video frame subsequences and a prediction signal of a video frame of another one of the interleaved video subsequences.

3. The method of claim 2, further comprising:
quantizing the residual signal by using a quantization level grid, wherein the quantization level grid corresponds to a quantization level grid used for quantizing a residual signal for encoding the P frame of the video frame sequence.

4. The method of claim 3, further comprising:
quantizing predicted macro-blocks of the P frame and the redundant B frame by using a same first quantization parameter (PRED_QP).

5. The method of claim 4, wherein the first quantization parameter (PRED_QP) corresponds to a second quantization parameter (P_QP) used for quantizing a macro-block of the video frame sequence.

6. The method of claim 1, further comprising:
quantizing a macroblock of the P frame of the video sequence by a third quantization parameter (QP); and
quantizing a macroblock of the redundant B frame of the video sequence by a fourth quantization parameter (B_QP) calculated on a basis of the third quantization parameter (QP).

7. The method of claim 6, wherein the fourth quantization parameter (B_QP) is a shifted version of the third quantization parameter (QP).

8. A video frame decoding method, comprising:
decoding a video frame sequence protected by the method of claim 1 by a differential video codec, wherein the corresponding P frame is a lost video frame of the video frame sequence.

9. The video frame decoding method of claim 8, comprising:
recovering the video frame sequence based on the redundant B frame; and
displaying the recovered video frame sequence with a delay of one video frame after the decoding.

10. The video frame decoding method of claim 8, comprising:
restoring a state of the decoding; and
displaying non-redundant video frames without algorithmic delay after the decoding.

11. The video frame decoding method of claim 8, wherein the video frame sequence is decoded by using reference macro-blocks quantized with a first quantization parameter (PRED_QP).

12. A video encoder for encoding a video frame sequence protected by the method of claim 1, the video encoder comprising:
a motion compensator configured to determine a motion vector from a reference macro-block of the video frame sequence;
a discrete cosine transformer configured to determine discrete cosine transform coefficients of the reference macro-block and configured to determine discrete cosine transform coefficients of a current macro-block which is a macro-block of one of a P frame and a B frame of the video frame sequence; and
a residual signal processor configured to provide a residual signal based on the discrete cosine transform coefficients of the current macro-block and the discrete cosine transform coefficients of the reference macro-block, the residual signal encoding the video frame sequence.

13. The video encoder of claim 12, comprising:
a quantizer configured for quantizing the discrete cosine transform coefficients of the reference macro-block providing quantized discrete cosine transform coefficients of the reference macro-block; and
a de-quantizer configured for inversely quantizing the quantized discrete cosine transform coefficients of the reference macro-block providing quantized/dequantized discrete cosine transform coefficients of the reference macro-block, wherein
the residual signal processor is configured to deduct the quantized/dequantized discrete cosine transform coefficients of the reference macro-block from the discrete cosine transform coefficients of the current macro-block to provide the residual signal.

14. A video decoder for decoding a residual signal, the residual signal carrying a macro-block of one of a P frame and a B frame of a video frame sequence protected by the method of claim 1, the video decoder comprising:
- a de-quantizer configured for inversely quantizing the residual signal providing a residual signal macro-block;
- a motion compensator configured to determine a reference macro-block from the residual signal macro-block;
- a discrete cosine transformer configured to determine discrete cosine transform coefficients of the reference macro-block; and
- a decoding processor configured to provide a decoded macro-block based on the residual signal macro-block and a prediction signal macro-block,
- wherein the prediction signal macro-block corresponds to the reference macro-block when the residual signal carries a macro-block of a P frame and wherein the prediction signal macro-block is based on the discrete cosine transform coefficients of the reference macro-block when the residual signal carries a macro-block of a B frame.

15. The video decoder of claim 14, comprising:
- a quantizer configured for quantizing the prediction signal macro-block providing a quantized prediction signal macro-block; and
- a de-quantizer configured for inversely quantizing the quantized prediction signal macro-block providing a quantized/dequantized prediction signal macro-block, wherein
- the decoding processor is configured to provide the decoded macro-block based on a sum of the residual signal macro-block and the quantized/dequantized prediction signal macro-block.

* * * * *